US006709333B1

(12) United States Patent
Bradford et al.

(10) Patent No.: US 6,709,333 B1
(45) Date of Patent: Mar. 23, 2004

(54) PLAYER IDENTIFICATION USING BIOMETRIC DATA IN A GAMING ENVIRONMENT

(75) Inventors: Russel Tower Bradford, Incline Village, NV (US); Robert Anthony Luciano, Jr., Reno, NV (US); Russ Frederick Marsden, Gardnerville, NV (US)

(73) Assignee: Sierra Design Group, Reno, NV (US)

( * ) Notice: Subject to any disclaimer, the term of this patent is extended or adjusted under 35 U.S.C. 154(b) by 0 days.

(21) Appl. No.: 10/411,914

(22) Filed: Apr. 14, 2003

Related U.S. Application Data

(63) Continuation of application No. 09/908,878, filed on Jul. 17, 2001.

(60) Provisional application No. 60/300,029, filed on Jun. 20, 2001.

(51) Int. Cl.[7] ........................................ A63F 13/00

(52) U.S. Cl. ........................................ 463/29

(58) Field of Search .......................... 453/29, 22, 16, 453/42

(56) References Cited

U.S. PATENT DOCUMENTS 5,802,199 A * 9/1998 Pare et al. .................. 382/115
6,363,485 B1 * 3/2002 Adams et al. .............. 713/186

* cited by examiner

*Primary Examiner*—Melvin Jones
(74) *Attorney, Agent, or Firm*—Russ F. Marsden

(57) ABSTRACT

A system and method for using two authenticators to identify a player in a gaming environment is disclosed, where the second authenticator is based on biometric data. The two authenticators allow a two-level authorization process providing very high assurance that a player at a gaming machine is who they claim to be, and where the second authenticator, being based on biometric data, enables a player to quickly and easily authenticate documents and/or authenticate age while continuing to play at game machines.

17 Claims, 16 Drawing Sheets

General Game Device Having A Fingerprint (Or Other Biometric) Reader Coupled To An Independent Embedded System With Needed I/O Device(s)

General Gaming Device
Having A Fingerprint (Or Other Biometric) Reader

General Gaming Device
Having A Fingerprint (Or Other Biometric) Reader

General Gaming Device Having A Fingerprint Reader (Or Other Biometric Reader) And Copy Of A Player Fingerprint (Biometric) Data Base General Game Device Having A Fingerprint (Or Other Biometric) Reader Coupled To An Independent Embedded System With Needed I/O Device(s)

Finger Print Readers (Or Other Biometric Device) And Finger Print (Or Other Biometric Measurement) Database(s) In Networked And Non-networked Environments Method Of Creating A Fingerprint-Based Record (Or Other Biometric Record) In A Database A Method Of Using A Fingerprint (Or Other Biometric Measurement) In A Two-level Authentication Process Providing Automated, High Assurance W2G Processing A Second Method Of Using A Fingerprint (Or Other Biometric Measurement) In A Two-level Authentication Process Providing Automated, High Assurance W2G Processing Another Method Of Using A Fingerprint (Or Other Biometric Measurement) In A Two-level Authentication Process Providing Automated, Real Time, High Assurance W2G Processing Method Of Creating An Electronic Funds Account (EFA) Using At Least One Fingerprint (Or Other Biometric Measurement) As A Second Authenticator Using A Fingerprint (Or Other Biometric Measurement) In A Two-level Authentication Process Providing Automated Electronic Funds Transfers (EFTs) With High ID Assurance A Second Method Of Using A Fingerprint (Or Other Biometric Measurement) In A Two-level Authentication Process Providing Automated Electronic Funds Transfers (EFTs) With High ID Assurance Method Of Using EFA For Other Player Data Method Of Using An EFA For Promotional Gaming Credits Method Of Using
A Two Authenticator
System For Age Verification Single Button Apparatus For Play And Verification

PLAYER IDENTIFICATION USING BIOMETRIC DATA IN A GAMING ENVIRONMENT

RELATED APPLICATIONS

This application is a continuation from pending application Ser. No. 09/908,878 filed on Jul. 17, 2001, which claims priority from provisional application No. 60/300,029 filed on Jun. 20, 2001.

Incorporated herein, in full by explicit reference, is co-pending application Ser. No. 09/788,168 entitled "Method And Apparatus For Maintaining Game State", co-pending application Ser. No. 09/838,457 entitled "Data Entry System And Method For Gaming Devices", and co-pending application Ser. No. 09/819,112 entitled "Anonymous Player Identifiers In A Gaming Environment", these three referenced applications being owned in their entirety by the same entity as this application.

BACKGROUND OF THE INVENTION

1. Field of the Invention

This invention pertains generally to gaming systems. More particularly, the present invention relates to a method and apparatus for providing addition assurance that a player is who they claim to be by using biometric identifiers, particularly fingerprints, for player identification at gaming devices.

2. The Prior Art

High reliability player identification in a gaming environment is becoming increasingly desirable. In some gaming situations either positive identification or a signature or both are required. In the United States, an example is the occurrence of a gaming event which requires the filing of an income tax report form, currently designated by the IRS (US Internal Revenue Service) as form W2G. This is currently triggered by any winning event involving more than $1200. In many higher-stakes games, this would be triggered by every winning event. Other situations where positive identification is desirable is any type of automated funds accounting or transfers and age verification.

Currently, events which trigger the use of governmental forms are handled manually. When a winning event occurs at a gaming machine that triggers the need for a W2G, the player will need to wait until an attendant comes over and enables the payout and handles any required governmental forms. For funds transfers, a player will typically need to go to a customer service counter or separate kiosk; or, a player is dependent on the use of their player tracking card (a magnetic strip card), which is easily lost or stolen, which could result in the loss of any funds associated with the magnetic strip card (player ID card).

In the case of high stakes games, every winning event requires a governmental form to be filled out in the US. In such cases casinos will typically assign one attendant to each high stakes player, where the attendant takes care of the incessant governmental forms. Such requirements are burdensome to all concerned, from the casino who must provide the personnel to the players who must endure a "hovering shadow," regardless of how unobtrusive the casino attempts to make the attendants.

For age verification, the currently used method of controlling game use is through physical access. Typically the games are in an area that is physically isolated, and an attendant checks ID for admission into the areas as a whole. Otherwise, each game or set of games must be constantly monitored by an attendant, even when no one is at the machines.

Biometric identification systems such as fingerprint readers built by AuthenTec, Inc., in Melbourne, Fla. 32902, are known. These readers may supply raw image data to a processing unit for storage and analysis, or as is typically the case with commercial products, will record and transmit fingerprint characterization data, not an image. In the later case, the fingerprint itself (an actual image) will not be permanently stored; only a numeric characterization is kept.

Prior art numeric characterization of fingerprints makes use of a fingerprint's ridges and furrows on the surface of the finger. The uniqueness of a fingerprint can be determined by establishing a center or reference point, and characterizing the pattern of ridges, furrows, and/or other characteristics such as ridge bifurcation and/or a ridge ending points (sometimes called minutiae points) in relationship to the center point.

There are well known limitations when using fingerprint characterization data. The faster a fingerprint is read, the fewer details may be recorded (for example, establishing 40 correlation points rather than 80). In addition, the ability to read fingerprints themselves will vary depending on the condition of the skin on the finger, sweat, dirt, etc. Thus, it may be the case that a fingerprint read having 80 correlation points may produce, in a large database (over 100,000 entries), more than one match. That does not mean that the actual fingerprints are the same; rather, it means that the recorded characteristics appear to match more than one entry. This is typically not an issue in small populations or when using a small database, but will arise on occasion.

There are public and proprietary algorithms that attempt to use the data to minimize false positives and maximize correct rejections. The characterization data is stored in a database where it can be searched for matches. Typically the searches are sequential, which can result in long search times for any particular print if there are thousands to check. The amount of data kept per fingerprint also determines the search time and uniqueness of the characterization for each print.

Because of the difficulties in collecting, characterizing, storing, searching, and uniquely identifying fingerprint data (i.e., inexpensive readers may collect 40–50 characterizing points, which although reasonably good, may still only be unique to an approximate range of $1/10,000$), fingerprints have not been usable as a single source of identification means in a dynamic gaming environment. Many of the issues faced by the gaming industry are not faced by other industries, which would allow the reasonable implementation of, as an example, an authentication system based on a single fingerprint for a home or office PC where there may be 1 to 10 authorized users. Such systems have tiny databases, can be relatively slow, and can be reasonably fallible (in terms of false positives) and yet meet the authentication needs of the few people and limited environment in which such a system will be used. Such systems are not suitable for situations as the gaming industry, which must meet the needs of both speed and a significantly higher degree of assurance in any particular authentication.

Thus, there is a need to provide an alternative means for player authentication having reasonably high reliability and assurance, coupled with very high authentication speed.

BRIEF DESCRIPTION OF THE INVENTION

The present invention enables a new and exciting way of allowing players to make use of electronic funds accounts, automate the generation of certain required forms, and to verify their age in a manner that is fast, inconspicuous, can be implemented to insure privacy, and provides very high assurance to the casino or other establishment using it.

The invention uses at least two authenticators for each player, with the most common implementation using exactly two. A common use of a third authenticator is as a "back-up" to the second authenticator. The first authenticator may be one of many types, with a typical first authenticator being a player ID card, a voucher with a unique, encoded, and preferably encrypted numerical ID on it, a unique alphanumeric sequence, or an RFID tag. Each first authenticator that is not data itself (i.e., a PIN) has the ability to have data read from it (i.e., the data on the magnetic strip of a typical player ID card). "First authenticator data" refers to the data that can be read from a physical first authenticator card, if such is used. To simplify word usage in this disclosure, "first authenticator" and "first authenticator data" refer to the same thing, that is, the information or data that is read from a physical item, where that physical item may be used to carry the data, or, in the case of an alpha-numeric sequence, is the data. Context makes clear if the discussion of a first authenticator is referring to a physical carrier or the data in the physical carrier or both. The second authenticator will be based on a biometric reading. The present invention may use any biometric reading, although those providing reasonably high degrees of uniqueness are clearly preferred. It is expected that at the present time, the predominant biometric used will be based on fingerprints.

A player identification database is also used, where an entry corresponding to a player comprises at least one record (typically, exactly one record), and the record has fields containing data, information, or pointers. The records have fields corresponding to a first authenticator and a second authenticator, providing authenticator data therein or pointers to authenticator data. The second authenticator will always have data that correspond to a biometric measurement. It is not required that a player release any personal information to the casino or establishment to make use of the present invention; that is one of its benefits. In many cases a player can derive even greater benefits by providing certain data to a casino or establishment, as explained below, but it is fully expected that a significant number of players and a large number of small gambling halls or locations will use anonymous identifiers (identifiers having no names associated with them). Another user of anonymous identifiers will remote gambling establishments, which allows them to carry out age confirmation without keeping a permanent record of each player. Again, there are advantages to a player providing some personal data, but it is not necessary to make use of the present invention.

A player and a casino or establishment uses the present invention in several steps. The first is to create an entry in the player identification database, which associates a first authenticator and a second authenticator. The player then goes and uses a game device. While playing or using a game device, the player will eventually take an action that will require confirmation that they are who they say they are. The player presents their first authenticator to the game device, which is used to get the associated second authenticator. The player indicates they are ready to authorize an action (an EFT transfer, a game play, to authorize a form); then, to authorize the action the player presents their second authenticator.

Remembering that the second authenticator is always biometric data, all the player has to do is use the biometric reader. In the case of fingerprints, a quick touch of a fingerprint reader does the job. The second authenticator is checked, and if the fingerprint data just read matches the fingerprint data in the second authenticator, the action is authorized and carried out. Now, as long as the player is at this game device any further authorizations will only require that the player touch a fingerprint reader. This is extremely fast and very non-obtrusive, while providing both the player and establishment a very high degree of assurance that the correct person is carrying out the actions. In one embodiment, this enables very fast and efficient W2G generation—currently a very annoying aspect of any higher stakes games.

DETAILED DESCRIPTION OF THE PREFERRED EMBODIMENTS

Figure 1:
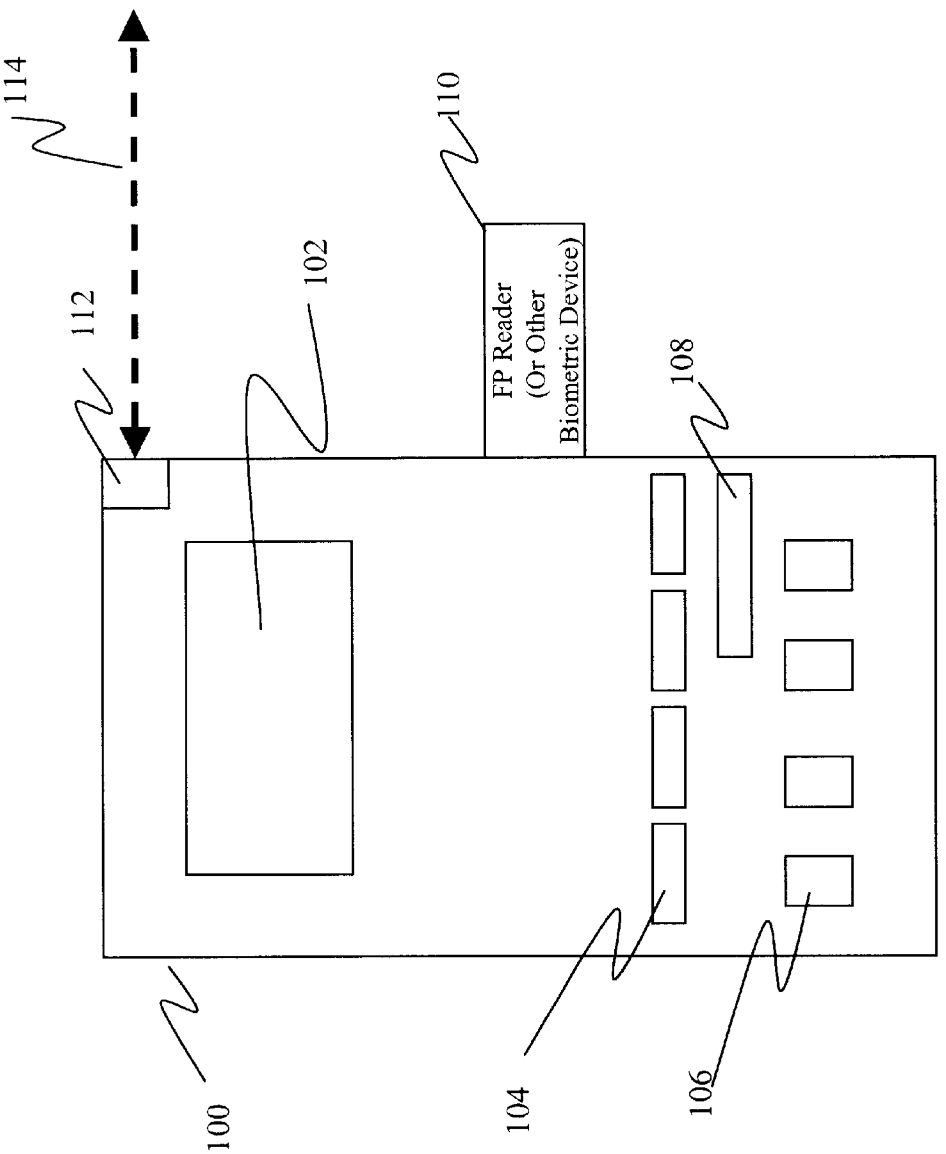
FIG. 1 is a functional block diagram of an example system having a fingerprint reader in conjunction with at least one other player identification means accordance with the present invention.

Persons of ordinary skill in the art will realize that the following description of the present invention is illustrative only and not in any way limiting. Other embodiments of the invention will readily suggest themselves to such skilled persons having the benefit of this disclosure.

Referring to the drawings, for illustrative purposes the present invention is shown embodied in FIG. 1 through FIG. 16. It will be appreciated that the apparatus may vary as to configuration and as to details of the parts, and that the method may vary as to details, partitioning, and the order of the acts, without departing from the inventive concepts disclosed herein.

The present invention provides new methods and apparatus having superior authentication of players than available in the prior art, while further providing for a player's ease of use of the enhanced authentication. It does this by combining at least two authenticators per player in an easy-to-use and manage system. A player first presents some form of initial identification to the gaming device, then (not always right away) provides a second means of authentication based on a biometric measure such as a fingerprint (defined below). The combination of the two identification steps provides two critical properties in a casino environment. First, because of the combinatorics involved, a significantly higher degree of assurance is achieved when the two authentication events, using a first and second authenticator, are used in combination than is possible using a single authenticator. Second, recurring authentication is made significantly easier for both the player and the casino, for example during an extended period of game play, while still retaining the higher degree of assurance provided by the two-step authorization method.

The first level of identification used by a player is called the first authenticator, and is defined as whatever a player first presents to the system to identify themselves. The first authenticator may be one amongst many choices, where the chosen form will depend on the needs and desires of the individual and the system implementation. A non-exhaustive list of first authenticators that are expected to be in use now or in the near future include: voucher IDs; a first fingerprint; a biometric other than a fingerprint such as hand geometry, face geometry, iris scan, or retinal scan; an alpha-numeric sequence (this includes PINs, but further includes any sequence of numbers and letters, case sensitive or not, that may be usable to identify a player); magnetic-strip cards (usually in the form a traditional player ID card); embedded RFID tags (may be in a key fob, a wallet-sized card, a lapel pin, and numerous other forms which are easy to for a person to carry and use); smart cards; magnetic diskettes; optical disks and/or mini-disks; or handheld devices with an IR or RF interface (i.e., a PDA such as a Palm Pilot™).

In addition, a preferred embodiment will allow a player to use one of their preexisting cards or forms of identification. This will include allowing a player to use a credit card, check card, debit card, and the like. In addition, when current driver's licenses are replaced in the near future with those having a common read means throughout the US (expected to be either a form of smart card or having machine readable symbols on one surface of the card), those driver's licenses could be used as well. It is important to note that the use of these cards is for data matching only. It will not be used to access or record anything having to do with the meaning of card when used as a first authenticator. Thus, a player who wants to use a debit card they already have as a first authenticator would allow the information on the magnetic strip of the card to be read and kept as first authenticator data. When the player then goes to a game device, the player presents their card to the reader. The data that is read off of the card is used to find matching first authenticator data in the player ID database. That is the extent of its use. Thus, the actual meaning of the data on the magnetic stripe is not important; it is simply being used as a unique data sequence to find a matching data sequence in the player ID database. Thus, as used in this disclosure "player ID" is any authenticator, designated as a first authenticator, that has the property of having data useable as first authenticator data in a player ID database.

"Presents" is defined in this disclosure to mean any action needed by the user of an authenticator to have the authenticator read by a reader designed to read that authenticator. The exact actions will, of course, vary depending on what type of authenticator a player is using. In the case of a magnetic strip card, the presenting action would be to insert the card into a magnetic strip card reader (like an ATM and a bank card). In the case of an RFID tag, the presenting action would be to hold the RFID tag momentarily in front of the reader. Each type of authenticator and its associated input device would have a corresponding meaning of "presents", where in each case the net result is that the needed data on or in the authenticator to be read, is read by the reader corresponding to that type of authenticator.

The concept of a database, being well established, is not explained in this disclosure. It should be noted, however, that as the word is being used in this disclosure it is intended to cover a complete range of databases, the size, complexity, and expense being determined by the application and location (where the database being referenced resides). For example, at the low end of the database scale there may be a database located on an embedded system in a game device cabinet implemented as a flat file, comma-delimited database held entirely in RAM, where entries or records could be delimited by a nonprinting character such as a carriage return, and fields would refer to alpha-numeric strings between commas. At the high end would be a fully relational database implementing extremely complex records and having the capability to hold hundreds of thousands of entries, coupled with the ability to handle large amounts of secondary storage and requiring a dedicated platform for best performance. Thus, there is no implied restriction as to any particular type, kind, or complexity of database. Any database implementation that works in a particular system using the present invention is included in this disclosure.

The second level or second means of identifying oneself to a system is through the use of a second authenticator. The second authenticator is a biometrically-based authentication means. A biometric authentication means may include fingerprints, hand geometry scans, retinal scans, iris scans, facial feature scans, or other biologically-based measurement means which are readily available to be used in a casino environment. In the description of this invention, one embodiment is based on the use of a fingerprint as the second authenticator. However, the inventive concept is broader than the use of a fingerprint alone, encompassing any second authenticator that is based on a biometric measurement that can be measured (scanned, read-in) from a human who is sitting or standing at or near the gaming device which has just been presented with a first authenticator. For example, it is fully contemplated that as very high frequency, low energy electromagnetic emitters/readers become available at reduced prices, a scan of some of the bodies natural emissions using a passive or resonant reader may be used, as well as other forms of evolving technology such as iris readers/scanners.

Fingerprint data is used in a preferred embodiment of the present invention. The word "fingerprint" can be used, in the common vernacular, to mean both the image left when a fingertip is pressed onto material that will allow some type of imprint to be left or body oils and skin that leave a distinguishable mark having a unique set of ridges, etc., as well as meaning the unique pattern on the fingertip itself, even if not transferred to another surface. To avoid confusion with nuances of the word "fingerprint" when used alone, and add as much clarity as possible, this disclosure will use the term "fingerprint data". "Fingerprint data" is defined to mean at least some data, where the data is such that it is storable and useable by digital logic and/or digital computers, that is derived from a portion of a fingertip, and that is some way measures, identifies, or characterizes some portion of the pattern of swirls, edges, separation points, etc., found on a portion of the fingertip being used for identification. Thus, it is clear that the term "fingerprint data" does NOT mean a COMPLETE set of data that will always uniquely identify a single finger from a single human. Rather, it is used to mean there exists a data set (a data set is more than one bit of digital data), usable in digital circuitry, having some data derived from at least a portion of a fingertip where the fingertip is being used for identification purposes. This definition avoids the problem of having to constantly differentiate between the fingertip, the fingerprint on the fingertip, the fingerprint left after a fingertip is pressed to a surface, the exact method used to collect fingerprint information in a fingerprint reader, and the completeness of each reading of a fingerprint. "Fingerprint reader" means any method and device that may be used to yield "fingerprint data".

FIG. 1 shows a functional block diagram of an example game device. As used in this disclosure, a "game device" includes any electronic or electromechanical, mechanical, or table (manual) game device usably by a player for any function in a gambling or casino environment. "Game device" further includes the use of a remote computer, typically a home PC, when used for gambling or gaming purposes by being operably coupled through a network to at least one central server, and where being so coupled over a network allows the home PC to be used for any type of gambling, for placing bets, for the display of game (betting) results, and any similar acts. Included in the definition of game device are also any games of skill (only) or any game that combines skill and chance where a player may win award credits, game credits (changeable to monetary equivalents), or cash prizes. An example of this type of game could be any of the driving skill games currently popular in arcades. In a casino setting players may play against a clock or other players, winning game credits or making bets on outcomes that are not done in an arcade setting (i.e., same skill games coupled with various types and forms of betting).

In an arcade setting, the game user inserts money and the only reward is to be able to play the game. If they are good enough, they may get to put their initials on the game display. Some arcade games also dispense universal tickets (typically the small yellowish or redish tickets measuring about ½"×1" and redeemable for trivia prizes such as candy bars and stuffed animals). This unrestricted arcade use is not the same as using the game devices for restricted uses such as gambling, pari-mutuel betting, etc.

Most often a game device will be a gambling or betting machine as just discussed, but the concept of game device further includes and is not limited to other devices such as EFT (electronic funds transfer) stations, prize award and redemption kiosks or stations, EFA account and voucher management stations, and any other player service and player useable devices that may be found in a casino, bingo hall, or other gambling or betting establishment.

Game device 100 includes the normal and well known internals needed in order to have a functioning game, such as at least one central processor, associated memory, input/output interfaces, peripheral interfaces to the video display, control buttons and lever, monetary input devices, slot machine interface board (SMIB), together with the firmware and software needed to implement the full functionality of the game (these internals not shown). Game device 100 comprises a conventional game of chance, such as a slot machine, video poker machine, video lottery device, keno machine, or bingo machine. The gaming device 100 may alternatively comprise a live table game of chance, such as a blackjack table or roulette table, where the functions described herein carried out by the gaming device are carried out by a table attendant.

Game device 100 further provides a video or reel display 102, play buttons 106, one or more first authentication readers 104 (typically a voucher reader, player tracking ID slot, or RFID reader), a fingerprint reader 110 (may be a different biometric device), a card/voucher printer 108, and a SMIB 112 which would typically be connected electronically 114 an RGC (remote game controller, not shown). In one embodiment reader 110 would have an interface (port) to SMIB 112, sending data and receiving data via connection 114. Other communications means may be used. As shown, reader 110 sends the raw biometric data out, unprocessed.

Figure 2:
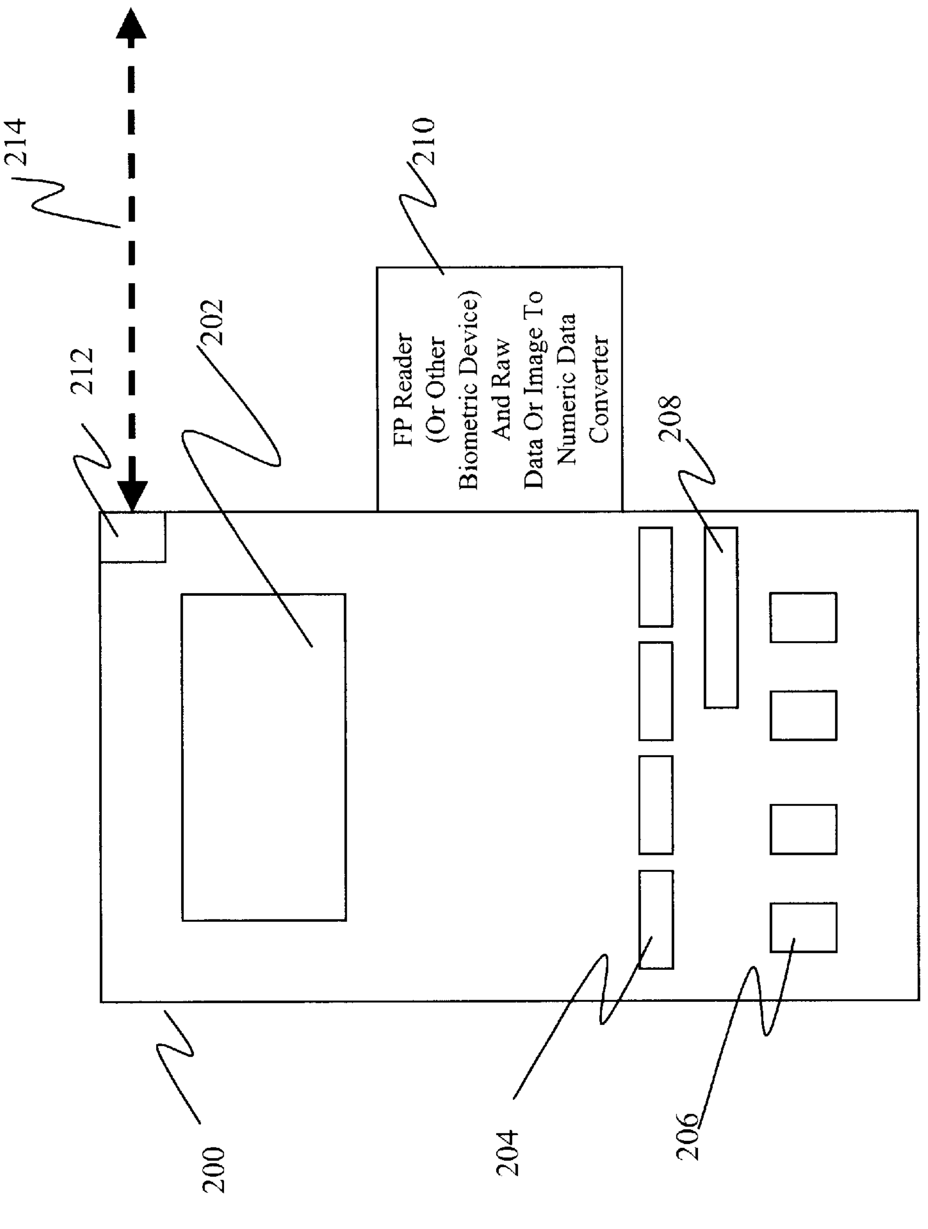
FIG. 2 is a functional block diagram of another example system having a fingerprint reader in conjunction with at least one other player identification means accordance with the present invention.

FIG. 2 shows a game device similar to that shown in FIG. 1, including game device (including a cabinet) 200, video or reel view area 202, SMIB 212, electronic connection 214, first authentication readers 204, voucher/card printer 208, and play buttons 206. In this case reader 210 includes the hardware and software needed to do initial processing of the image, scan, or read of the biometric data that will be the second authenticator. For example, in the case of a fingerprint reader only fingerprint data that characterizes some portion of the fingerprint being read will be communicated to a system outside game device 200, unlike FIG. 1 where the raw image data was communicated outside game device 100. It is expected that this will be a common implementation, very likely the cost common, as it will allow local control of the read process to maximize useful results, while sending far less data over whatever external electronic connection is being used (therefore using less of the available bandwidth and allowing a faster response).

Figure 3:
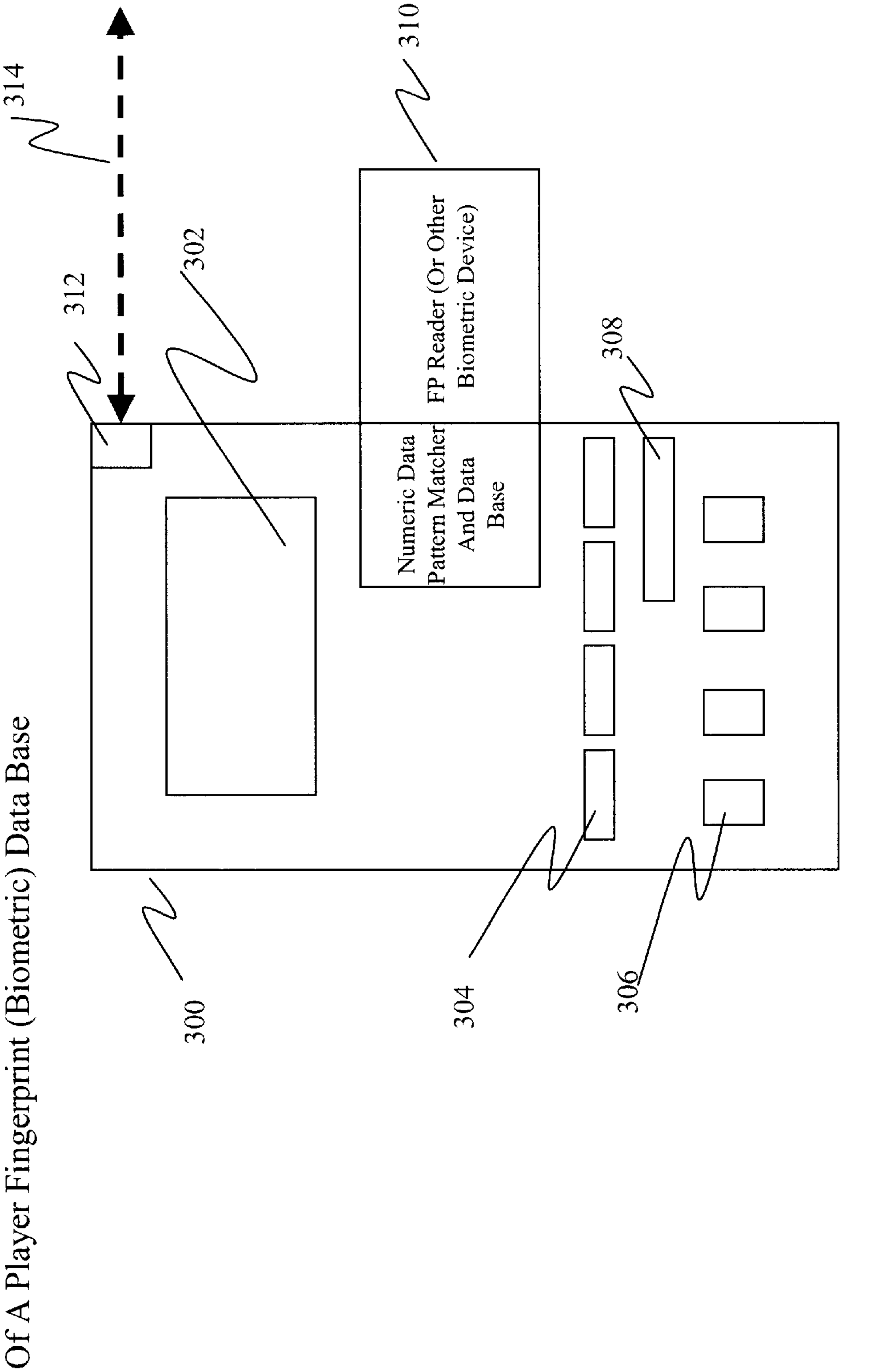
FIG. 3 is a functional block diagram showing another example system having a fingerprint reader in conjunction with at least one other player identification means accordance with the present invention.

FIG. 3 shows a game device similar to that shown in FIGS. 1 and 2, including game device (including a cabinet) 300, video or reel view area 302, SMIB 312 (optional), at least one electronic connection 314 (optional), first authentication readers 304, voucher/card printer 308, and play or choice buttons 306. In this case reader 310 includes the hardware and software needed to do initial processing of the image, scan, or read of the biometric data that will be the second authenticator, and will further do the actual database lookup and attempted match for the authorization. In this case, the internals of reader 310 would include a processor, memory, and software dedicated to reader 310 that are sufficient to provide the compute resources needed for a database and the software used to match the reader data and the entries in the database. These internals are not shown, and would be invisible to a user. This is currently not expected to be the most widely used implementation, but may become so if the costs of embedded systems continue to drop, or may be needed in certain implementations where dynamic interconnections between machines and any type of backend system is limited or non-existent.

For example, in certain small installations it may be the case that there is one game device shown as in FIG. 3, with the other devices having the functionality shown in either of FIG. 1 or 2. The game device that implements the fingerprint data lookup capability shown in FIG. 3 provides the same service to those game devices with configurations shown in FIGS. 1 and 2. Alternatively, each game device could be essentially a standalone machine if configured as shown in FIG. 3, with database updates being carried out by the use of CD-ROMs individually delivered to each game device. Clearly not the optimal choice in most sophisticated casinos having a well established electronic network, but one that could be employed where specific needs dictate.

It should be noted here that if the game device is a remote PC being used over a network, including use over the internet, any biometric data (in a preferred embodiment, fingerprint data) comparison will typically be carried out at the central server. This would be to help assure that compromised or substitute biometric data was not being used at the remote location. To further provide assurance, a preferred embodiment would use encrypted biometric data where the biometric data is encrypted within the biometric reader and its accompanying logic, then decrypted at the remote sight, providing significantly higher assurance for the transmitted biometric data. In a preferred embodiment the player using a remote PC would use a fingerprint reader as the biometric device, touch the fingerprint reader with their fingertip, fingerprint data would be encrypted and sent to the remote system, the fingerprint data checked for authenticity, and upon a positive authentication the server would further initiate game play. Thus, to the remote user, each touch of the fingerprint reader (or other biometric input device) would simultaneously authorize them as being the player and initiate a single game play. This allows the remote player to use "one-touch" game play. Game play would end when the server received a game play end indicator. A game play end indicator can be one of many events, including but not limited to: a time-out; a carrier drop; network communications disruption; or, a designated signal to the server (i.e., a specified key or key sequence) from the player.

Continuing further with the remote game device use, it is expected that the most common implementation of two authenticators for identification will use a first authenticator comprising an alpha-numeric sequence, and a second authenticator comprising fingerprint data. However, as smart cards, memory cards, and other similar identifiers become more common, meaning more people will have the devices needed to read from this type of identifiers, it is expected that these (specifically, the data on them used for identification) will gradually become more common than alpha-numeric sequences that must be remembered and entered manually, and will become the first authenticator of choice.

In order to provide better (faster) service to players, a game device configured as shown in FIG. 3, including the network connection, could be implemented with a very limited-capacity embedded system having a small database. The configuration would allow for the local caching of (for example) the database entries or records corresponding to the last 10 players to use the game device. For an even smaller and less expensive implementation, only the second authenticator data associated with the current player would be cached; this would require no database on the embedded system. Every time the player needs to use a second authenticator, the authentication data check will take place locally. This would provide exceptional response at a very moderate cost.

There is one further example where a system such as shown in Figure would be useful. In a very small casino or gambling room where each machine is a standalone machine, the fingerprint reader and fingerprint comparator (explained further below) in the logic operably connected to the fingerprint reader but separate from the game device, may readily be configured to contain enough memory to store fingerprint data corresponding to that usually derived from a single fingertip. After reading the data in, further use of the machine would be enabled by the person whose fingerprint data was used. The first authenticator, comprising the presenting of an ID to a casino attendant, is not memorialized by the issuance of a paper voucher (or something similar); rather, the person's fingerprint data is read into the fingerprint reader and stored, and they are thereafter able to play the machine by presenting their fingertip for authentication.

Figure 4:
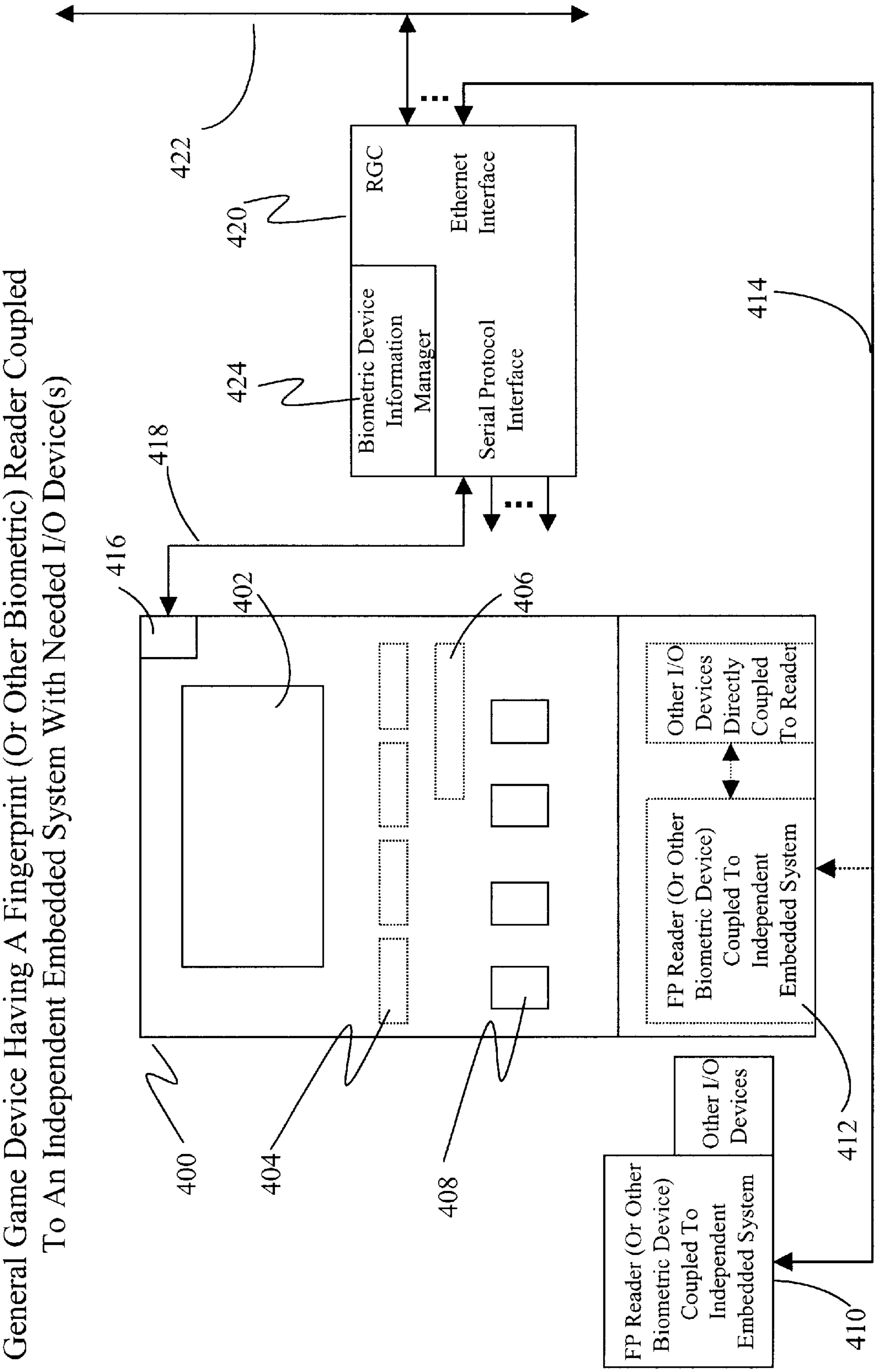
FIG. 4 is a functional block diagram of yet another example system having a fingerprint reader in conjunction with at least one other player identification means accordance with the present invention.

FIG. 4 shows a game device 400, video or slot view area 402, a typical SMIB (Slot Machine Interface Board) 416, a typical serial-protocol-based communications means used over and electronic connection 418 to RGC 420, first authentication readers 408 (optional, indicated by dotted lines, as the final configuration further depends on reader 410 or 412), voucher/card printer 408 (also optional, indicated by dotted lines, depending on the implementation of reader 410 or 412), and play buttons 406.

In this case the biometric reader is shown in two possible physical locations relative to game device 400. In one embodiment, the biometric reader and any needed I/O devices are physically outside the game device 400. This would be used in cases where the system will be retro-fitted to an existing game device 400, and where no modifications to the game devices can be made. Reader 410 would be in very close physical proximity to game device 400, preferably appearing to a player as a contiguous cabinet with game device 400, or as an extension to the cabinet housing game device 400. It could also be implemented on a separate standalone mount outside game device 400, but the separate standalone mount is not a preferred embodiment. Reader 410 has an embedded system, further comprising a processor, memory, peripheral buses, and I/O interfaces needed in order to provide the hardware support for a standalone system that can read and otherwise process the biometric data being read (internals not shown). Reader 410 may also include a voucher, ID card, or other first authenticator reader, shown as "Other I/O Devices". This allows reader 410 to operate completely independently of game device 400 (there will be a logical interaction through the use of RGC 420, but no direct electronic connection). In addition, it would allow game device 400 to be devoid of the typical player card slot or any other type of first authenticator reader. Since reader 410 may also contain a voucher/card printer (or optical or magnetic reader/writer), game device 400 may also forgo a voucher printer 406. This frees up that space for game-related displays and functions, another advantage of the present invention.

Reader 410 is shown connected to RGC 420 via an electronic connection 414. In one preferred embodiment, this will be an Ethernet connection and will interface to RGC 420 via RGC 420's Ethernet port (be on the same Ethernet network 422 as the rest of the backend machines) rather than using the typical serial protocol interface currently found on SMIBs. Game device 400 will continue to communicate with RGC 420 using its standard serial connection 418 through SMIB 416. None of game devices 400's communications, internal or external, is effected by this preferred embodiment of the present invention.

In another preferred embodiment, the biometric reader and associated embedded system will be implemented within the cabinet that contains game device 400. This is shown in dotted-outline-form as reader 412, connected using Ethernet 414. Except for its physical location, reader 412 is identical to reader 410. It will still be completely electronically separate from game device 400, using a separate communications line to RGC 420 (and to any other machine on Ethernet 422).

In this preferred embodiment, the user interface will be a high resolution touchscreen approximately 6" square, in a bezel fitted into the portion of the cabinet below the bolster area (below where the play buttons are found), slanted up at the player at an angle to allow for easy reading and touching (ranging from approximately 25–45 degrees from vertical). The touchscreen would be connected via short cables to the rest of reader 412.

Reader 412 is further comprised of an embedded computer system, typically on a single board and having its own power supply (that will depend on the power supply of game device 400, which may or may not be sharable) and having a processor, memory, and support chips so as to implement an embedded system, including an embedded OS such as a UNIX-based system installed, with a selection of I/O ports and/or cable connections as needed for the Ethernet connection, video I/O, and as needed for each I/O device installed with the reader 412 system. The other I/O devices may include, but are not limited to, a voucher reader and/or printer, a combination bill and voucher reader and/or printer, at least one biometric reader (shown as a fingerprint reader), and support for any other first authenticator reader device that may be required for specific casinos. In one preferred embodiment these other I/O devices would be installed as slots or reader pads along side of the touchscreen, in the lower portion of the cabinet. The embedded system board and other needed parts or boards, connectors, etc., would be installed on the inside of the cabinet, in any area where space permits and where there would be no interference with the existing game device's internal mechanisms or electronics.

A biometric reader, or any other input and output device, that is configured and coupled with a game device as just described is considered to be associated with a particular game device. The association is carried out, in the illustration, by DBIM (Biometric Device Information Manager) 424. BDIM 424 resides in RGC 420, and will be described further below.

Figure 5:
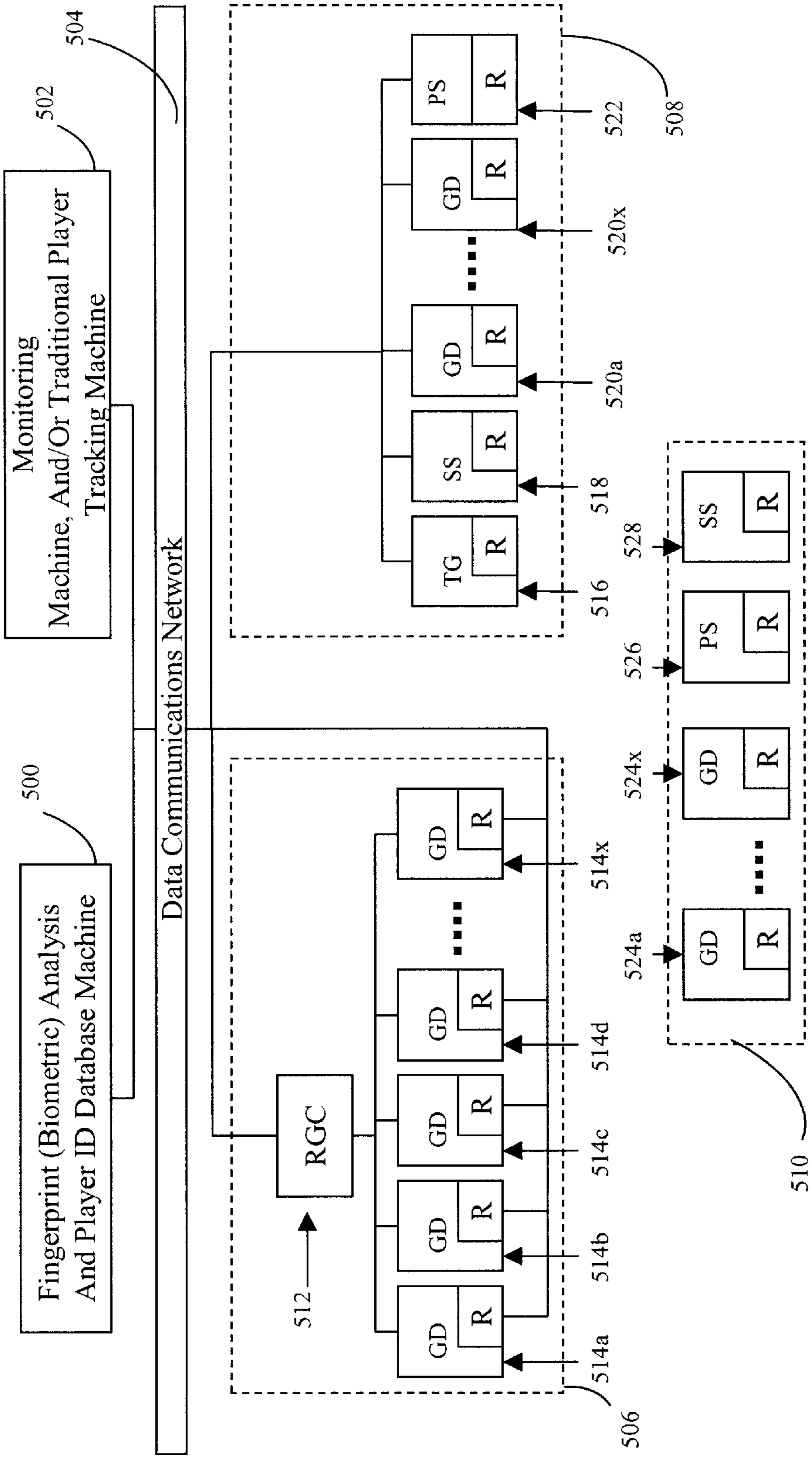
FIG. 5 is a functional block diagram of system configurations for implementing authentication using biometrics in accordance with the present invention.

Turning now to FIG. 5, there is shown an example of a two-level biometrically-based authentication system which comprises a plurality of individual systems (or subsystems) shown as 506, 508, and 510. FIG. 5 illustrates that a wide variety of systems and subsystems may be utilized with the present invention. Subsystems include those that are both connected and unconnected.

Subsystems 506 and 508 are each operatively coupled for communication to a monitoring or traditional player tracking machine 502 via a data communications network 504. Subsystem 506 comprises a plurality of game devices coupled to a remote game controller (RGC) 512. RGC 512 is coupled to communication network 704 for communication with backend machines 500 and 502, as well as any other machines that can be addressed directly on the communications network. Subsystem 506 includes individual game devices 514*a*–514*x*, where there can be any number of individual gaming devices between 514*d* and 514*x*. If there are too many for one RGC to support, then there will be more RGCs and each bank of gaming machines will connect to one RGC.

Subsystem 506 also shows that each game device 514n has a box labeled as "R" standing for "reader", where the box comprises a reader as described in FIG. 4. The readers are connected directly to the communications network 504.

Subsystem 508 is similar to subsystem 506, but shows an installation where the game devices 520*a*–520*x* do not use an RGC, but connect directly to backbone network 504 (in a preferred embodiment, using Ethernet). In this configuration, the functionality described as implemented in the RGC would instead be implemented (in software) within Biometric Analysis and database machine 500. Because each machine in subsystem 508 is connected directly to the backbone network, the readers shown do not have a separate connection illustrated. In a preferred embodiment, each reader would use an Ethernet connection into the rest of the network. Also illustrated are the reader's use with table games ("TG"), service stations ("SS", defined as any machine that allows a player to make deposits or withdrawals in their EFA without having to go to a gaming device), and a prize station ("PS", any device having prizes which may be purchased with any combination of credits or EFA funds, where the prizes may or may not be dispensed immediately). In each case, the biometric device is used for authentication purposes to assure the person trying to access an EFA is the person whom is authorized to do so.

Subsystem 510, unlike subsystems 506 and 508, is not coupled to communication network 504. Each gaming device will be configured as described in FIG. 3 above, having some capability to make use of biometric data directly. Of necessity, this would be a limited implementation and not very dynamic, corresponding to smaller, more remote installations. Shown are gaming devices 524*a* to 524*x*, a prize station 526, and a service station 528. Although creating an EFA would not be dynamic, such an installation could still exist with database updates being carried out by hand (i.e., data transferred via CD-ROM once a day) and having limited capabilities such as deposit only. This also encompasses the situation described above for FIG. 3, where one of the devices shown could act as the database server for the other devices, and where the interconnectivity of the machines is not shown.

Subsystem 506 is expected to be a typical installation. Part of the functionality of the two-level (use of two authenticators) authentication process will be carried out at the RGC 512, and part of the functionality will be carried out at the Biometric database machine 500. Because the reader (in this subsystem, configured similarly to FIG. 4) that is associated with each gaming device is not electronically connected, it is the RGC that contains the functionality, found in a software component called the BDIM (biometric device information manager, not shown), that couples the data, information, and messages from both and acts accordingly.

RGC 512 (corresponding to RGC 420 in FIG. 4) is configured during system initialization to properly correlate each biometric reading device, and any further I/O devices coupled to and operated by the same reader, with a particular gaming device (remember that "game device" includes, but is not limited to, a game, prize station, service station, player self-service station, attendant service station, or table game station). This association will be permanent until the system is reconfigured by authorized personnel. In one preferred embodiment, this association is managed by a software component residing in the RGC called a Biometric Device Information Manager (BDIM), shown in FIG. 4 as BDIM 424. Thus, all the data being received from a game device and all the data being received from a reader will be known to the BDIM as originating from the game entity, where a game entity is a reader and its physically associated game device.

BDIM 424 (also residing in RGC 512 but not shown) manages the transactions related to authorization. All communications from a reader (biometric device) are received and processed, used, or interpreted by the BDIM. In a preferred embodiment this will be via an Ethernet running TCP/IP throughout a casino. These communications are coupled, as needed, with information being received from the associated gaming device through the gaming device's standard serial communications protocol interface and received by the RGC at its corresponding port.

A typical transaction is the initiation of an EFT transaction. A player uses the biometric reading device's touch-screen (alternatively a dedicated keypad or keyboard) to signal she or he wants to transfer funds into or out of the game device. The DBIM in the RGC will keep track of a player presenting a first authenticator; if the player has already done so, the BDIM will trigger the reader to prompt the player for their second authenticator, which will be a biometric reading. If the player has not, during this session, presented a first authenticator the player is prompted for both a first and second authenticator. The BDIM will then take the data sent from the biometric device and, using the first authenticator, finds an entry in the biometric database by communicating with a backend database machine (shown in FIG. 5 as machine 500). The DBIM will then send the same backend machine the second biometric authenticator and ask if it matches the biometrically based data corresponding to the first authenticator in the database. If they do not match, the session is closed and the player informed to contact an attendant at a customer counter.

If a match is found, the BDIM prompts the player for the desired action (i.e., store game credits, cash-out, or use the funds in the players' EFA to get more game play credits). The player, using the touchscreen, indicates what the player wants. The BDIM then either "cashes out" the player from the game device by sending the appropriate signals to the game device via the traditional serial-protocol-based communication link, or, sends signals to the game device to add game play credits over the same communications link. The players' EFA is updated accordingly. Thus, the BDIM coordinates the activities between the gaming device (game, service station, player self-service station, attendant station, prize station), the biometric reader and associated input devices, and whatever backend machine or machines have a players' identification data in a database, and/or a players EFA and associated data. Note that a player's EFA may be kept on a separate machine than the player's identification database—it will depend on the needs and configuration of each particular casino. In particular, if a casino already has an EFA and EFT system, it may be better to initially implement the two-level authentication system contained in this disclosure in a separate database on a separate backend computer system, with the authentication handled on one machine but the actual EFT transactions handled by the existing machine and database. There could then be a gradual migration from one system to another, with (for example) new players having EFA accounts on the new machine and existing EFA kept on the existing machines. If desired, a casino may decide to keep the authentication system separate from the EFA system, although some of the benefits of the present system may not be fully realized.

An important property of the present invention is that the disclosed system may be integrated into an existing casino's infrastructure, rather than requiring the implementation of an entire replacement system. In addition, there may be a gradual replacement of existing systems, depending on the needs of the casino. It is important to realize that a casino has the option of using the present invention in any part or portion of the casino—it does not need to be used everywhere to be effective. For example, a casino may decide to implement the present invention in areas designated as "high-stakes" play, while leaving the lower-stakes machines as is. Alternatively, a casino may decide to implement the present invention in a high stakes area and additionally implement the system in certain areas (or on certain banks of game machines) in the standard or lower-stakes areas of the casinos, allowing players who use the system in high-stakes areas to choose to make use of the system on game machines located on the regular floor as well.

Figure 6:
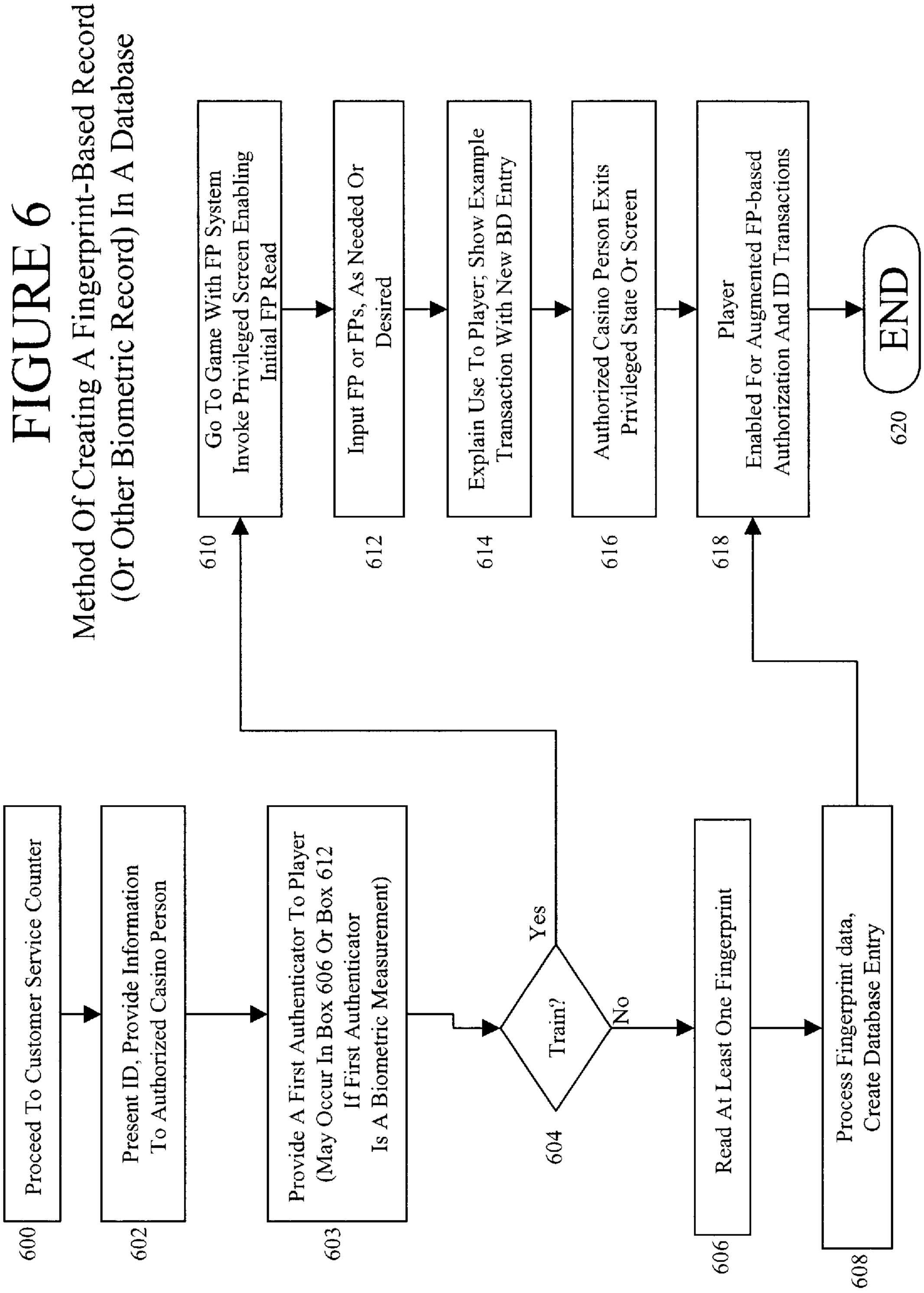
FIG. 6 is a flow diagram for creating an initial database entry to be used with biometrically augmented authentication in accordance with the present invention.

Referring now to FIG. 6, a method for the creation of an entry having biometric data in a player ID database is shown. A player currently without an entry in the player ID database would first go to a customer service counter and ask for an account, box 600. The process then moves to box 602, where an authorized person enters the initial data from the player into the database, using a privileged data entry screen into the player authentication database. In a preferred embodiment there will be selected, small subset of trusted employees who will make entries into the player ID database. In order to open the privileged screens allowing data entry, the authorized casino personnel will be required to use their own employee identification cards (badges, RFID tag, of other first authenticator where said first authenticator is not a PIN or other memory-only authenticator), and will further be authenticated by the use of their own biometric measurement. In one preferred embodiment, casino personnel will be required to enter two fingertips' worth of fingerprint data in succession (after they present their first authenticator) to be allowed access to the privileged screens on the player ID system.

The authorized person enters the player's data and information into the player ID database. An important aspect of the present invention is that a casino may decide how much information is required from a player to make use of the enhanced authorization system. In one preferred embodiment the casino will ask the player if they want to have their social security number entered into the player information database (in the US, generally used as a universal identifier and in particular used by IRS as an individual tax payers' identification number). Some players will be comfortable with that, and others won't. Authorized casino personnel will explain to the player the advantages and disadvantages of each choice. In particular, allowing a casino to enter a player's social security number into its database, coupled with other player information and data from the game device showing the amount won, will enable fully automated W2G generation. Some players, because of the relative infrequency of such an event for their type of play, may wish to continue to use manual or semi-automated W2G generation, so will not provide a social security number.

Manual W2G generation is the current method in use, where an attendant comes to the game device where the player is located and the player fills out a hardcopy W2G form. Semi-automated W2G generation is disclosed in co-pending application Ser. No. 09/838,457, titled "Data Entry System And Method For Gaming Devices", the full application explicitly incorporated herein. Disclosed is a method and apparatus for allowing a player, while staying at the gamine device they are currently using, to use an interactive device (in one preferred embodiment, a touchscreen) to fill out and electronically sign a W2G form. A player may wish to preserve their social security number in a manner anonymous to the casino, so can always chose to use a manual or semi-automated method for filing out W2Gs.

Players who want to make use of the fully automated W2G generation will need to provide all of the information needed such that their database entry can supply the needed data fields to a forms program, generating a completed W2G thereby. Authenticating generated W2Gs is discussed more fully below.

Continuing now with box 603, the casino attendant may provide the player with the player's first authenticator. In one preferred embodiment the first authenticator will be a tangible card (perhaps using an already existing player ID card) or voucher. If a voucher is given to a player, it is called a "player ID voucher", having encoded thereon (and perhaps further being encrypted) a unique identifier, the data being readable by a voucher reader. As discussed above, other forms of first authenticators may be used. In another preferred embodiment, the first authenticator comprises fingerprint data from a fingertip. If the first authenticator comprises fingerprint data, the fingerprint data may be entered later in the process. Box 603 is left and diamond 604 entered.

In diamond 604, the attendant asks the player if they need training. If the player has never used the system before (something that can be partially checked using expired player ID entries, if a casino chooses), a preferred embodiment will tell the attendant to train the person by indicating that course of action on the attendant's screen. This is to prevent confusion when a player starts to use the two-level authentication system for the first time. If a player is creating a new entry but has experience with the system, either previously at this casino or at another casino using a similar system, the "no training" choice may be made by the attendant.

If the player is to be trained, the "Yes" exit is taken from diamond 604 and box 610 is entered. The attendant goes to a game with the present invention installed on it. There may instead be a special "demo game", set up at or near the service counter, where the game is set to invoke specific winning sequences to allow a player to see what happens and how to respond. A preferred embodiment allows the attendant to use any game device in the casino having the present invention, where the attendant invokes a special set of screens or options on screens on the biometric device reader by identifying themselves as casino personnel. The privileged screens allow the attendant to do two things: enter a player's biometric measurements for entry into the player ID database, and to show any special screen or choice sequences to the user as part of the training (i.e., allow a "fake" transaction so the player sees the sequence of actions to take). Box 610 is left and box 612 is entered.

In box 612, a preferred embodiment uses fingerprint data as the biometric measurement. The player would use the reader with their chosen finger, with the privileged mode set by the attendant enabling this data to be made part of the player's ID entry in the player ID database. If, at box 603, the player decided to use two fingertips for authentication, the attendant would have the player enter two sets of fingerprint data in sequence, using their chosen fingers. Box 612 is left and box 614 entered.

In box 614, the attendant makes use of the newly created entry to demonstrate to the player the use of the two-authenticator authentication process. This may involve the use of a newly created EFA, a W2G event, or simply identifying themselves to the system. The casino will choose which training scenario they want to present to the newly enrolled players. Box 614 is left and box 616 entered.

In box 616, the attendant exits from the privileged screen (s) and training mode. The game device, if it is a regular floor game, is now ready to be used in a normal manner. For added protection, a preferred embodiment will require that while the game is in entry and training mode, the casino attendant's ID card (or other physical device) must be left in the machine; if it is unexpectedly removed the game device immediately reverts to a non-privileged mode and/or sets itself to a non-play state. In addition, a preferred embodiment requires that the attendant's card be physically attached to the attendant (i.e., by a retractable cord), preventing an attendant from accidentally leaving a card in a machine. Box 616 is left and box 618 is entered.

In box 618, the player is now ready to use the system and the system has an entry in the player ID database corresponding to the player, having a first authenticator and a second authenticator useable by the player. The end state 620 is now reached.

If, at diamond 604, the player does not require training the "No" exit is taken and box 606 is entered. The player, still with the attendant at the service counter (or other location designated for this activity, such as a small office or room or designated game device), now enters the player's biometric measurement into the system. In one preferred embodiment this will be fingerprint data, read from a fingerprint reader. If, while at box 603 a player chose to make use of two fingertips, a different fingertip for each authenticator, the attendant will enter a sequence of two sets of fingerprint data. The first fingerprint data set will be the first authenticator and the second fingerprint data set will be the second authenticator. Box 606 is left and box 608 entered.

In box 608, the system creates the entry in the player ID database corresponding to this player, associating the data corresponding to a first and second authentic authenticator with this entry, the second of which is always a biometric authenticator and in one preferred embodiment, is a fingerprint data. Box 608 is left and box 618 is entered. Box 618 corresponds to the system being ready for use by the player, with the process now complete at end point 620.

Figure 7:
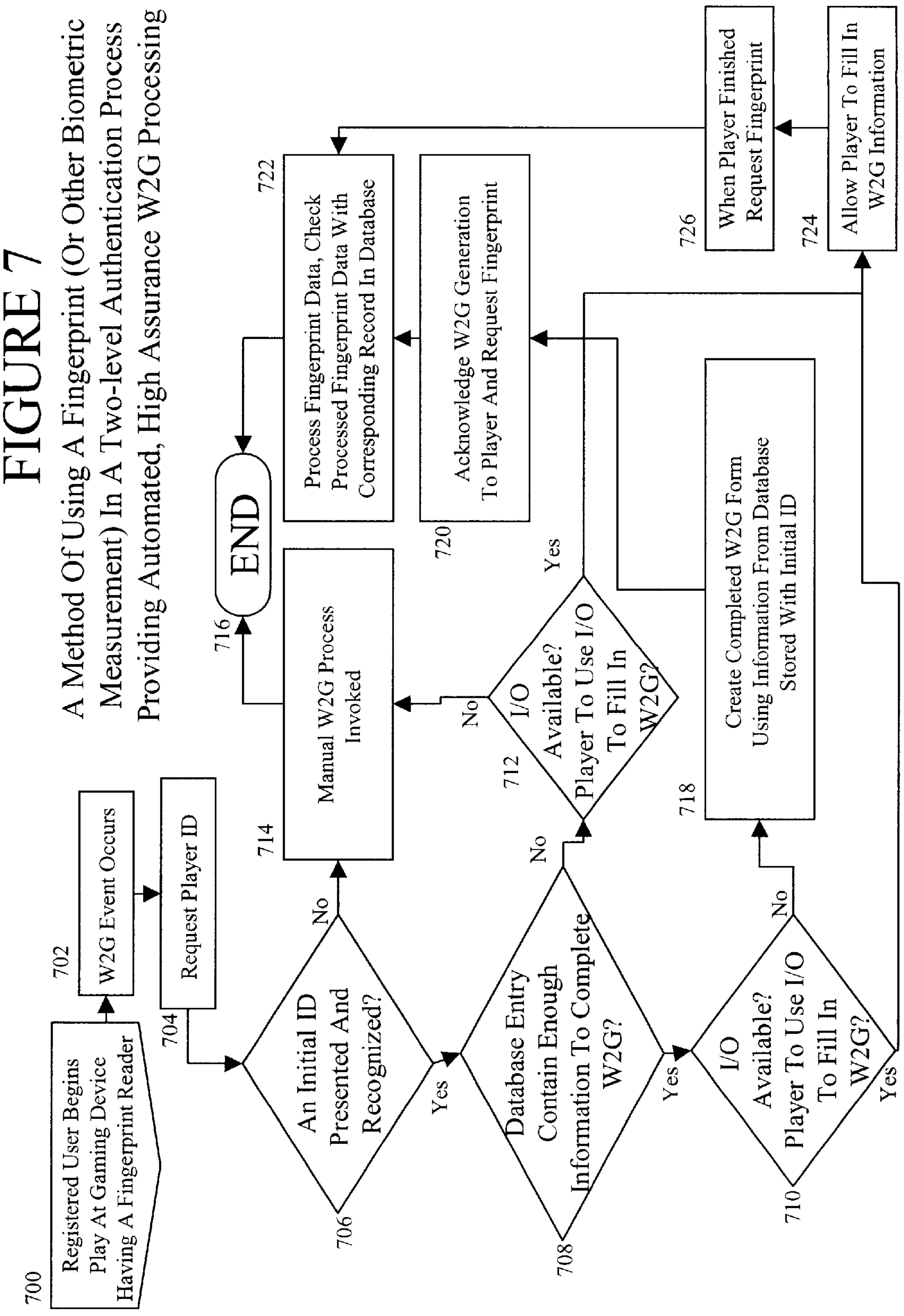
FIG. 7 is a flow diagram showing a use of biometrically augmented authentication with automated W2G generation according to the present invention.

Continuing with FIG. 7, a method of using two authenticators for the automated issuance of IRS W2G forms is shown. Box 700 begins when a player, who must already have an entry in the casino's player ID database, begins to play at a game having a biometric reader. FIG. 7 will be presented in the form of one preferred embodiment, where the biometric device implemented is a fingerprint reader. However, the process discussed and disclosed will work for any biometric device, which would then be substituted for the fingerprint reader. Such devices may include, but are not limited to, hand geometry readers, iris scanners, facial geometry readers (including a camera that would be placed in the game cabinet, the camera providing an image from which facial geometry and other facial features may be characterized), retinal scanners, and human body emissions readers.

The player plays until a W2G event occurs, in which case box 700 is left and box 702 is entered. A W2G event is currently defined as any winning event dispensing more than $1200, which requires the player to fill out United States Internal Revenue Service (IRS) form W2G. However, this same process will equally apply to any form that must be filled out by a player due to the occurrence of a game event. Box 702 is left and box 704 entered.

Box 704 corresponds to the action of asking the player for a first authenticator. The first authenticator will typically be a card, voucher ID, or similar form of player ID, but may be fingerprint data from a fingertip. The player presents a first authenticator, or, alternatively, the player doesn't present any ID and either the process times out or the player indicates they have no player ID on the touchscreen or other I/O device. Box 704 is left and diamond 706 is entered.

Diamond 706 corresponds to making a decision based on the initial authenticator. There can be several situations encountered at this point in the process. One, the first authenticator is presented and is found to be valid, corresponding to an enabled entry in the player ID database. Two, the first authenticator can be read but does not correspond to a complete, valid, or enabled entry in the player ID database (for example, the entry has been expired, revoked, or never had second authenticator data associated with it). Third, the presented authenticator has no corresponding entry in the player ID database. Fourth, no authenticator is presented by the player at all. In all but the first case, the first authenticator is invalid and the "No" exit is taken from diamond 706 to box 714.

Although not discussed in detail here, the different reasons for rejection of the first authenticator (or, the player not presenting a first authenticator), can lead to different actions by the casino. For example if the authenticator was revoked, security may be called. If the authenticator has simply expired, the player may be asked if they want to renew their authenticator by updating their player ID information, and if they indicate yes, an attendant would come and take care of renewing the player's entry in the player ID database. If the player presents no authenticator, a similar path could be taken (asking if the player wants to create a player ID, coupled with an immediate grant of free game credits if they do).

Returning to box 714, the actions here correspond to the traditional method of handling forms—the play stops game play and waits for a casino attendant to arrive. The player fills out the required W2G form by hand, signs it, and the casino attendant enables continuing play on the machine. This path then ends at end node 716.

Referring again to diamond 706, if the first authenticator is valid and the corresponding player ID entry in the player ID database is enabled (has a second authenticator) the "Yes" exit is taken to diamond 708. Diamond 708 checks the data available that is associated with the first authenticator. In one preferred embodiment, it is a player's choice if they want to give information like their social security number to a casino; the present invention is readily usable and provides advantages to both the casino and the player whatever choice the player makes regarding the information permanently stored with the casino. If there is not enough data to enable a W2G to be filled out, the "No" exit is taken to diamond 712.

In diamond 712, two items are checked. The first item checked is the presence of an input device available to the player. If none exists on the particular game device, the "No" exit is taken from diamond 712 to box 714. If there is an I/O device the player can use, the player is asked if they want to use a semiautomated method to fill in the W2G (see co-pending application having number Ser. No. 09/838,457 entitled "Data Entry System And Method For Gaming Devices" filed on Apr. 17, 2001, incorporated herein in full by reference), where the player uses the I/O device to fill out the W2G fields. If the player indicates a "No" answer, the "No" exit is taken from diamond 712 to box 714, where a manual process is invoked as described above.

If the there is an I/O device the player can use and the player wishes to use the semi-automated method of filling out the W2G, the "Yes" exit is taken from diamond 712 to box 724. The actions corresponding to box 724 are discussed later below.

Returning to diamond 708, if there is enough information in the player ID database to complete a W2G, the "Yes" exit is taken to diamond 710. The actions taken in diamond 710 are the same as those described for diamond 712 above, but having different results. If there is no I/O device available to the player, the "No" exit is taken to box 718 without asking the player if the player wants to fill in the fields of the W2G themselves, since they can't.

The action taken in box 718 is to fill out a W2G using information from the player ID database. As soon as the W2G has been generated internally, box 718 is left and box 720 entered. The actions taken that correspond to box 720 include communicating to the user that a W2G has been prepared, and the user needs to acknowledge and authorize it by providing a biometric measurement, in this case fingerprint data. Box 720 is left and box 722 entered.

The process draws to completion in box 722. The player's biometric data, in this a fingerprint data, is checked against the data in the player ID database for the second authenticator. If a match is made, the W2G is authorized via the fingerprint data, and the actual form is generated in hardcopy for the IRS and for the player (in one embodiment, the player's copy is automatically sent to the player's address contained in the player ID database). If the biometric authenticator provided by the player does not match the data found in the player ID database, then either the player is using the wrong finger (in the case of a fingerprint-based biometric), there is a reader problem, or another user is using the machine at this point in time. In all cases manual intervention is required. Authorized casino personnel will attend to the player and machine that generated the mismatch and will take whatever action are needed (manual intervention portion not illustrated). The process finished at end node 716.

Returning to diamond 710, if the player has I/O available (in one preferred embodiment, this will always be true as the player will have a touchscreen available) then the player is asked if the player wants to manually fill in the W2G or if the player wants it to be generated automatically. If the player indicates they want the W2G automatically filled in, the "No" exit is taken to box 718, resulting in the same sequence described above when the type of I/O available to the player cannot support a manual entry of the fields in a W2G. If the player indicates they want to fill in the W2G themselves using the semi-automated method (i.e., using the input device to fill out the fields), the "Yes" exit is taken from diamond 710 to box 724.

The actions taken in Box 724 correspond to presenting the player with the fields needed to complete a W2G and allowing the player to enter the required information. When the W2G is completed, the player indicates this (or alternatively, the forms filling program being employed detects entries in each field that match the general requirements of the field). Box 724 is left and box 726 is entered.

In box 726 the player is prompted to use present their fingertip to a fingerprint reader. The player responds by applying the appropriate fingertip to the fingerprint reader. Box 726 is left and box 722 entered.

As described above, the actions taken in box 722 are to check the second authenticator (in this case, fingerprint data) against the data associated with the second authenticator in the players' entry in the player ID database. If they match, the W2G is generated in hardcopy with copies sent to the IRS and the player's address (alternatively, kept for the player to pick up at a customer counter). If they don't, manual intervention by authorized casino personnel will be required, because there is either a player needing training, a temporary mismatch in the biometric that the authorized attendant must address (i.e., a new scar on a fingertip), an equipment problem, or a security problem. All will typically require casino personnel involvement.

Figure 8:
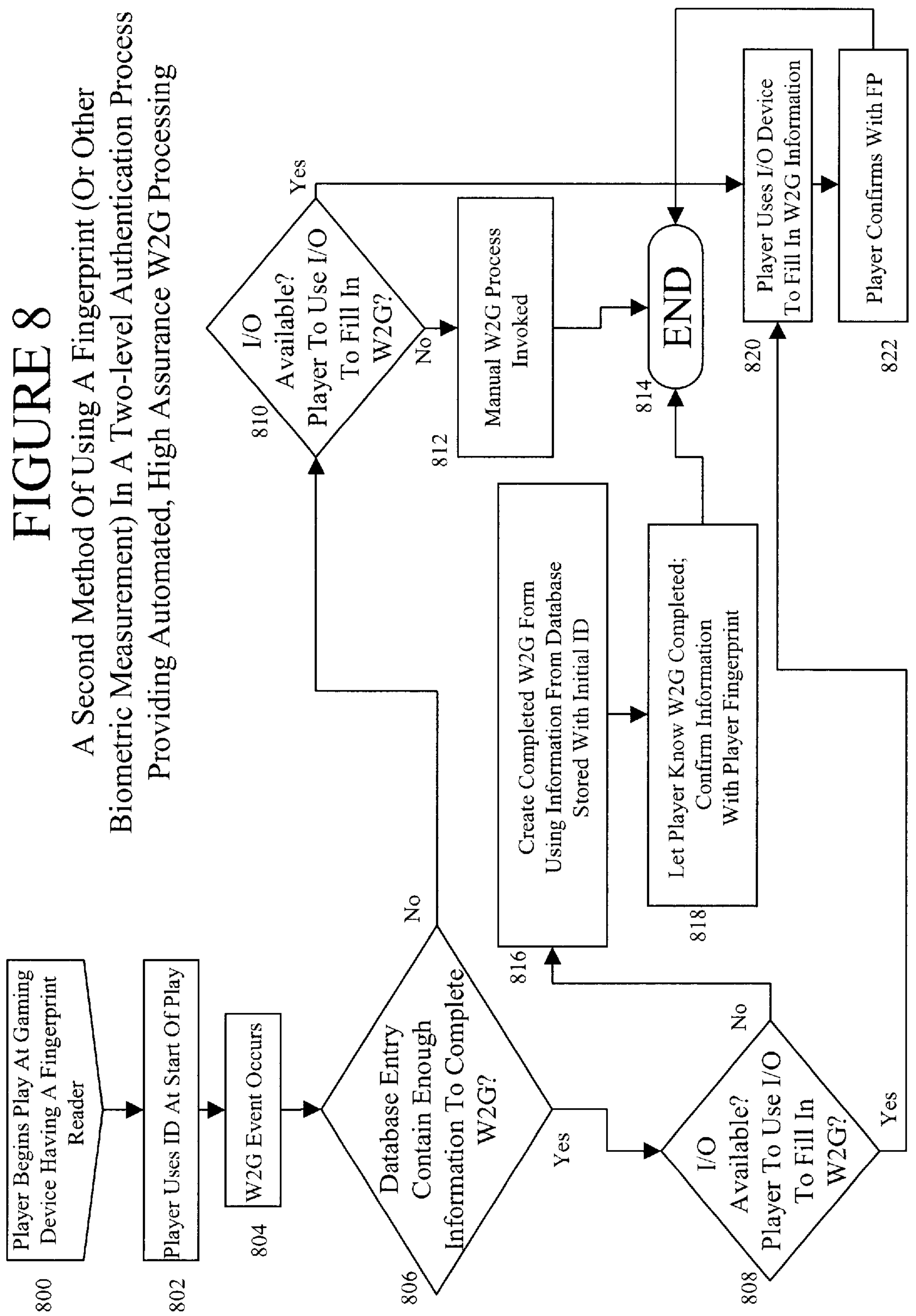
FIG. 8 is flow diagram showing another example of the use of biometrically augmented authentication with automated W2G generation according to the present invention.

Continuing on with FIG. 8, a slightly different process is illustrated. In this process, a player starts playing at a game having a biometric device (in this illustration a fingerprint reader) at box 800. Box 802 is immediately entered after the player sits down, with the player using an initial authenticator at the start of game play. This corresponds to the player inserting a player tracking card, using a voucher ID, passing an RFID device in front of an RFID reader, or presenting some other form of first authenticator. The first authenticator is checked to be sure it is valid and enabled for use with a second authenticator. If the first authenticator is not valid, the user is notified and appropriate action taken, as described in FIG. 7 above. Box 802 is left and box 804 is entered.

Box 804 corresponds to the occurrence of a W2G event (defined above in FIG. 7). As soon as a W2G event occurs, box 804 is left and diamond 806 is entered. The action taken in diamond 806 is to determine if there is enough information in the player ID database (and from the game device, which includes the amount of the winnings) corresponding to this player ID to fill out a W2G without the player providing any additional information. If there is not enough information to complete a W2G, the "No" exit is taken and diamond 810 is entered.

The actions taken corresponding to diamond 810 comprise two questions. The first is to assess if the game currently in use by the player has a player I/O device that will allow a player to fill out a W2G (such as a keyboard on a touchscreen). If the answer is no, the "No" exit is immediately taken to box 812.

Box 812 comprises the actions needed to carry out the traditional manual W2G form filling process. Typically that means a casino attendant brings the form, the player fills it out, the prize won on the game machine is awarded, and the game machine enabled for further play. After completion of this manual process the end node 814 is reached.

Returning to diamond 810, if there is an I/O device the player is asked if they would like to do a semi-automated W2G fill in, meaning that instead of having a casino attendant bring the form and do a manual fill in, the player will use the I/O device to complete the form. If the player answers no, the "No" exit is taken from diamond 810 and box 812 is entered, where the manual process described above is used. If the player indicates a yes answer, the "Yes" exit is taken to box 820.

Actions corresponding to box 820 include having the player use the I/O device to fill in all the fields needed to complete a W2G, as explained in FIG. 7 above. After completing the W2G, box 820 is left and box 822 is entered.

Box 822 corresponds to asking the player to confirm their identity with a biometric measurement, in this case fingerprint data. The player provides the data (fingerprint) and the data is checked against the entry for the second authenticator found in the player ID database entry corresponding to the first authenticator. If the second authenticator does not match, casino personnel must intervene and the process becomes manual. If the match succeeds, the process finishes with a W2G of the event being printed and sent to the IRS, a copy sent to the address listed in the player's player ID database entry, the amount won being issued to the player in the manner enabled in the current environment (i.e., may be cash, chips, or electronically credited), and the game enabled for further play. The process finishes at end node 814.

Returning to diamond 806, if there is enough data in the player ID database corresponding to the entry that matches the first authenticator, the "Yes" exit is taken to diamond 808. The actions taken in diamond 808 are two-fold, the first being to check the game currently in use for a player-usable I/O device that could be used to fill out a W2G. If there is no such device, the "No" exit is taken immediately and box 816 entered.

Box 816 corresponds to the action of filing in a W2G from the information in the player ID database. Box 816 is left and box 818 entered.

Box 818 corresponds to the action of informing the player that a W2G has been prepared, and the player must confirm by entering (providing) a biometric measurement, in this case fingerprint data. The player puts the appropriate fingertip on the fingerprint reader, the fingerprint data is checked with the second authenticator data in the player ID database associated with the first authenticator. If they match, the W2G is generated, a copy sent to the IRS and a copy made available to the player (this may be sent directly to the address found in the player ID database, sent to their room if they are staying at the casino, sent to another address specified by the player, or kept at the service counter for player pickup at a later time). The process now goes to end node 814 and is finished.

Returning to diamond 808, if the player chooses to use the semi-automated method of filling in a W2G (i.e., to use the I/O device to fill in the required information), then the "Yes" exit is taken to box 820. The process proceeds using box 820, box 822, and ending at finish node 814 as described immediately above, allowing the player to fill in the W2G on-line, confirm with their fingerprint data, be awarded the prize or money, re-enable the game, and proceed with play.

FIGS. 7 and 8 disclose methods of using a first and second authenticator that encompass numerous game device configurations. In one preferred embodiment shown in FIG. 9, the process is made very quick and smooth (to the player) by setting certain options, as specified by the player, before game play starts. One choice is to set a flag that indicates that the information in the player ID database will be used to fill out a W2G, coupled with whatever information is needed from the game device, whenever a W2G event occurs. The option of always using the player ID database (coupled with data from the game device, as required) to fill out W2G forms may be enabled by the player at the start of play after presenting their first authenticator to the game they wish to play, or may be set permanently by setting a flag in the player ID database by an authorized casino attendant, at the direction of the player (this initial step is not illustrated in FIG. 9). The player then goes to a gaming machine having a fingerprint reader (in one preferred embodiment) or other biometric input device, box 900. Box 900 is left and box 902 entered.

Box 902 corresponds to the player presenting their first authenticator at the game device. The system that implements this method may have a game device as shown in FIG. 1, 2, or 3. If the game device is of the type shown in FIG.

1 or 2, the system will find the player ID associated with the first authenticator, or possibly multiple potential IDs if the first authenticator is a biometric measurement, on some backend machine associated with the game machine being used. If the game device is of the type shown in FIG. 3 or 4, then the cached entries may be kept on the game machine itself.

As explained above, there may be more than one initial match to a first biometric authenticator when, for example, fingerprint data is used as an initial (first) authenticator. If there is a potential for more than one match, the player will be requested to input their second authenticator to uniquely identify one player (the steps dealing with player authentication when there is more than one possible match are not illustrated).

Figure 9:
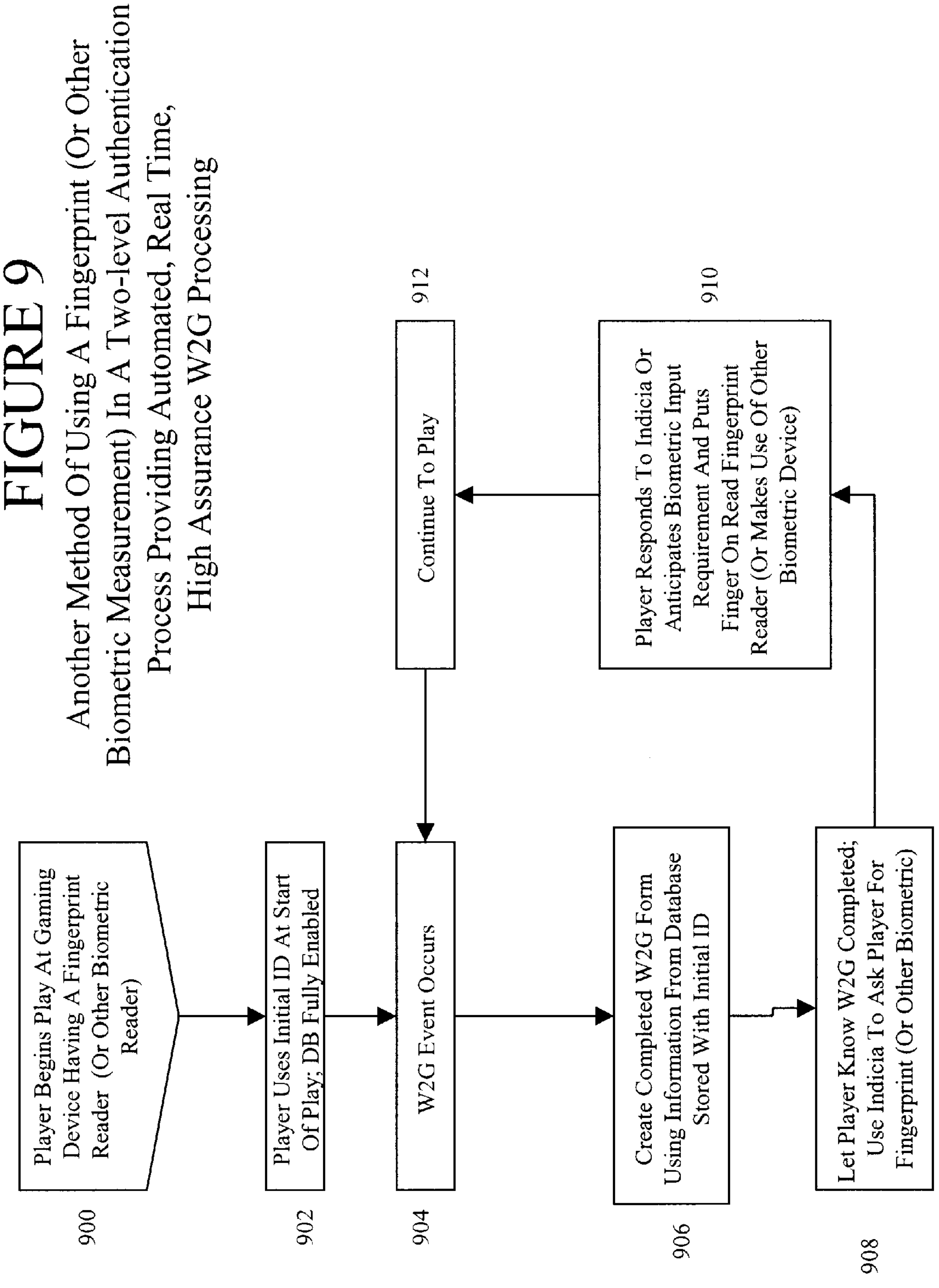
FIG. 9 is a flow diagram showing yet another example of the use of biometrically augmented authentication with automated W2G generation according to the present invention.

Continuing on in FIG. 9, the now enabled game system waits until box 902 is left and box 904 is entered, corresponding to a W2G event occurrence. As defined above, a W2G event is any event which requires the casino and the player to fill out a W2G form. Upon the occurrence of a W2G event, box 904 is left and box 906 is entered.

Box 906 corresponds to the action of using the player ID database coupled with data from the game device to fill out a W2G. Box 906 is left and box 908 entered. Box 908 corresponds to the action of alerting the player that the player's fingerprint data (or other biometric input) is required. This could take many forms, from a blinking LED located near the biometric input device, to a bezel that flashes, to a message on the video screen of the biometric reader and associated system, to a message shown on the main display of the game device being played. Box 908 is now left and box 910 entered.

The actions associated with box 910 are to read the biometric device for input. After the biometric measurement is taken and confirmed, the W2G is authorized. In a preferred embodiment, this will be a fingerprint reader and the player will momentarily rest their fingertip on the fingerprint reader. Note that the player, alerted to the occurrence of a W2G event, may anticipate the need to supply their second authenticator and will immediately provide fingerprint data by resting their fingertip on a fingerprint reader. It is OK to both generate the W2G and authenticate the event itself in parallel—no security or authenticity is lost. The reading will be used as the second authenticator, and will confirm the W2G generation and authentication. The player nor the casino need not concern themselves any further with this W2G event—it is completed, authorized, and authenticated. Box 910 is left and box 912 entered.

Box 912 corresponds to continued game play until another W2G event occurs. As soon as this happens, box 912 is left and box 904 entered. This loop continues as long as the player is using this game device, comprising the steps of: a W2G event occurs, player provides their second authenticator; system generates, the required W2G and using the second authenticator authenticates and authorizes the W2G; play continues. This is an incredibly efficient method of providing a secure, authenticated W2G while minimizing the interruption of a player while they play a game, the player interrupt only being the single use of a fingerprint reader (or other biometric input device).

The combination of efficiency, user friendliness, and high assurance (security) of the system is due to its use of two authenticators. This is also referred to in this disclosure as a "two level" system, referencing the fact that the present invention may use two authenticators which have different levels of assurance. The first authenticator may have significantly less assurance than the second authenticator. As disclosed above, the first authenticator may be a player ID card, voucher ID, keyfob with an RFID tag, or similar authenticator. This alone would only have the security and assurance typical of any of these types of ID cards—OK but not very high (cards may be switched, lost, stolen, etc.). Coupled with a second authenticator, where the second authenticator is a biometric reading (illustrated as fingerprint data) which can provide high assurance in and of itself, the two authenticators in combination provide a level of assurance that is very high, and can be designed to rise to the level of governmentally issued IDs, thereby enabling the automated issuance of W2Gs with the same assurance. The present invention also allows for the use of a first authenticator that is a biometric as well as requiring the second authenticator be a biometric. The combination of two biometric authenticators will typically require more time to process and confirm, but can readily be designed to provide an even higher level of assurance than that found with the use of a typical card-type first authenticator. An example of using two biometric authenticators would be a player choosing to use two sets of fingerprint data (using two fingertips) instead of a player ID card and one set of fingerprint data (using one fingertip).

Figure 10:
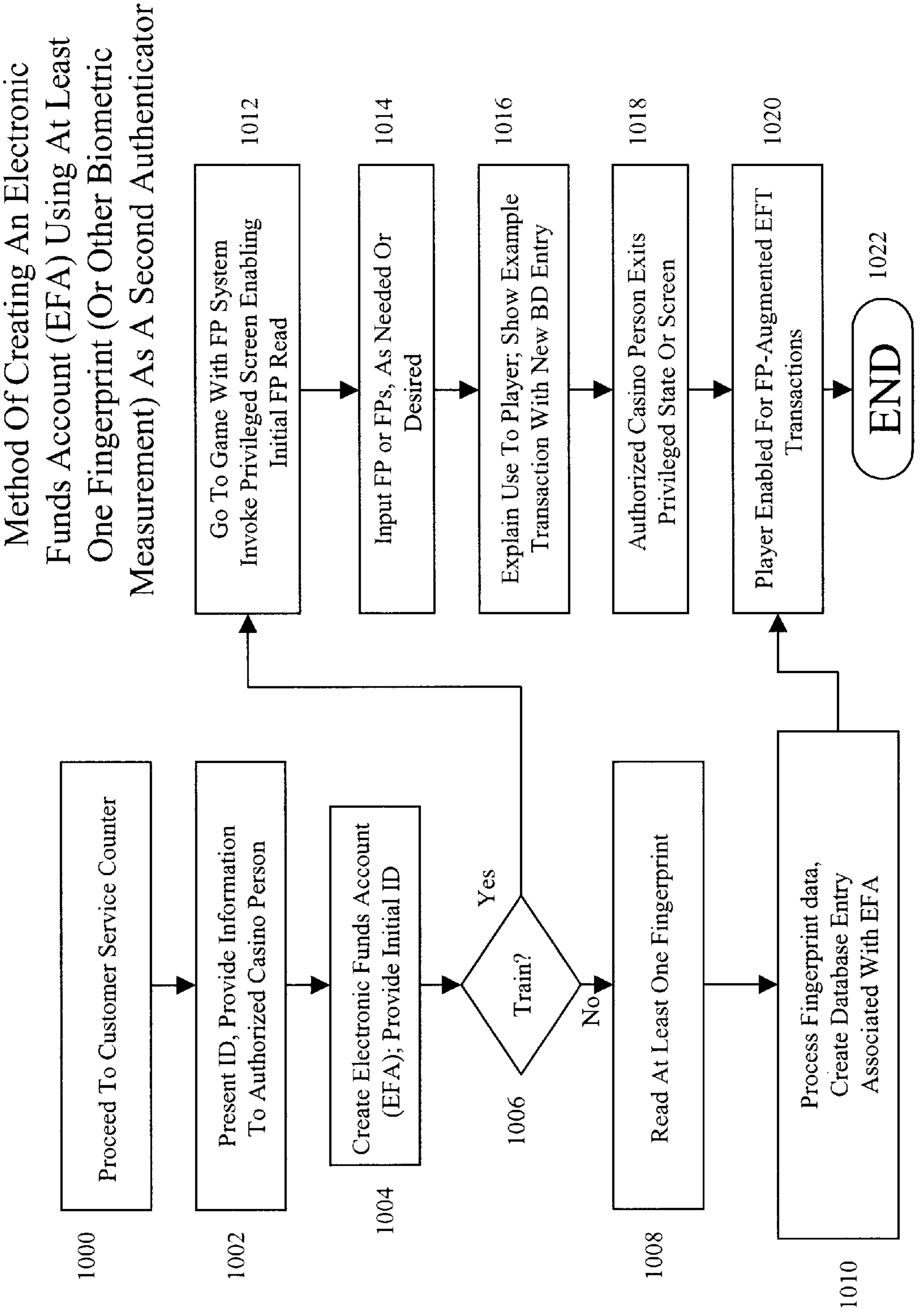
FIG. 10 is a flow diagram showing a method of creating an electronic funds account according to the present invention.

Continuing with FIG. 10, the initialization of an electronic funds account (EFA) based on a two-authenticator system is shown. Box 1000 corresponds to a player going to a customer service counter or other location where an attendant having access to a terminal (or station) where the attendant can invoke a privileged screen where they can enable an EFA. The authorized casino attendant will use their ID to invoke a special screen or set of screens that will set up and enable an EFA for player use. Proceeding from box 1000 to box 1002, the player presents any needed ID to the attendant for the type of EFA being created. Note that there may be a range of EFA accounts, from one where the attendant simply checks that the player is of age (18, 19, 20, or 21 depending on the jurisdiction), indicates the type of ID presented (i.e., a driver's license, a passport, etc.), and enables the account by having the player enter their fingerprint data using a fingerprint reader which is then associated with the player's first authenticator and any other information on a player ID database. The relationship between the player ID database and the EFA account system will depend on the casino implementing the system. A preferred embodiment will have a unified, combined system where the EFA data is kept in the same database as the player ID records, being an extension thereof. However, if the casino has another EFA system already in use, it may chose to implement the two-authenticator ID database in a different system and database, and have the authentication of the player take place there. Once authenticated, the associated EFA account will be enabled for use by the player using an agreed upon protocol between the two systems, and the player will then interact with the EFA system (this coupling will typically be invisible to the player).

As mentioned earlier, casinos will be free to implement different types, or levels, of EFAs. For basic transactions and simplest player convenience, the casino may simply check the player's age and set up the account with no more information being stored with the account. In this case, there would no fully automated W2G processing (for example), but the EFA would allow a player to make deposits into the account and then use the deposited funds to enable game credits as the player plays various games on the casino floor. The account levels or types would extend from this simplest type of account up to an account having the full information needed to generate completed W2Gs. The player determines which type of account the player wants, subject to the casino's guidelines. Finally, a first authenticator is either used by the player (i.e., a first fingertip providing thereby a first set of fingerprint data), or one is given to the player (i.e., an RFID tag in a credit-card-sized plastic enclosure). The EFA is now enabled for inputting the second authenticator.

Continuing from box 1004 to box 1006, a decision is made to train or not train the player. The decision will be based on the system itself, as well as the information given to the attendant by the player. At the casino's option, the system may be configured such that if a player has no previous recorded experience using a two authenticator system, the attendant will be required to go through an example of using the system with the player. Alternatively, the system may leave the decision entirely up to the attendant.

In one preferred embodiment, the system will alert the attendant if the player being enabled has no previous entry in the casino's player ID database, and is thus most likely unfamiliar with the system and will need some training. The attendant will then talk with the player, finding out if the player has experience with this system or one substantially like it (this takes care of the cases where a player may have used similar systems at other casinos even though they have never been at the current casino, so that any training would be a waste of everyone's time). The attendant would also check for "false positives", where a player with an expired account (or a traditional player's ID using only the player's card as an ID) and having the same name as the player being registered but they are, actually, different people. The attendant them makes a final decision as to training, going from diamond 1006 to box 1012 if training is needed.

Box 1012 shows one preferred embodiment, where the attendant walks with the player over to an actual game machine having a fingerprint reader and I/O device as shown in FIG. 4. The attendant uses a special authenticator to enable a privileged screen that allows the data being read at the biometric reader to be permanently recorded into the field in the player ID datable associated with a second authenticator, in this case fingerprint data. Proceeding from box 1012 to box 1014, the player uses the reader to input either one, two, or three sets of fingerprint data. The player may use one fingertip when the player (or casino) has chosen to use a first authenticator that is not fingerprint data, in which case the fingerprint data being read is the second authenticator. If the player and/or casino chose to use a system where the first and second authenticators are both fingerprint data sets, the player will now (in order) present two fingertips which will be used to generate first and second authenticator data using fingerprint data. Finally, it may be the case that for some accounts and for some players wishing addition assurance of accessibility (i.e., a "fingerprint backup plan"), another fingerprint data set using a different fingertip may be taken. This would be used in cases where the fingertip being used as the second authenticator for some reason cannot be read. This might occur if the person had hard-to-read fingertips due to dry skin or other skin conditions, had a temporary injury to one finger, and other similar reasons. This policy would be one decided on by the casino first (do we allow this as a matter of policy), and then, if allowed by the casino, the player (do I want this backup).

Continuing from box 1014 to box 1016, the attendant shows the player how to use the EFA to make transfers into and out of the game machine they are currently playing. After the attendant is satisfied the player knows how to make use of the EFA and the gaming machines in the casino, the process finishes in box 1016 and proceeds to box 1018.

The actions corresponding to box 1018 are those taken by the attendant to make sure the special, privileged screens being used for demonstration purposes are disabled before the attendant leaves. Any way of doing this that is to the satisfaction of the casino may be used, but typically will involve the identifier used by the attendant being physically removed from the gaming device used for the demonstration (if a "live" machine was being used). The identifier will usually be attached to the attendant (i.e., a special card on a retractable chain) so the attendant cannot walk away unless the card is removed. The removal of the card sets the game machine into a standard, ready mode. Box 1018 is left and box 1020 is entered.

Box 1020 corresponds to the player now having a fully enabled EFA account having two authenticators.

Returning to diamond 1006, if the attendant determines that the player does not need any training, the "No" exit is taken to box 1010. The actions taken in box 1010 are to finish enabling the account by creating a fingerprint data set to be used as a first or second authenticator (depending, as explained above, if the casino and/or player is going to use fingerprint data for both authenticators). If the fingerprint reading was for a first authenticator, a second finger is used for a second fingerprint reading for a second authenticator. In addition, if a "backup" fingerprint is desired for any reason, then another fingerprint reading is taken using another fingertip. This will be designated as a backup or alternative biometric authenticator to be used in certain situations, such as a failure of the second authenticator to be readable (note! this does not mean if the second authenticators is read and does not match, which results in a failure to confirm the player's identity and therefore the login will fail—this means if the presented fingertip cannot be adequately read due to skin considerations or similar problems).

Box 1010 is left and box 1020 is entered, corresponding to the completion of the player ID EFA account creation and the EFA now being ready for the player to use. The action finishes at end node 1022.

Not illustrated but fully contemplated is that, during the execution of the final phase of setting up the account (at box 1016 or box 1010, depending on the training choice made), the player may give cash or game credits to the attendant and have the attendant enter the credit amount into the players newly created EFA. This is enable the player to use their newly created account to load game play credits into a gaming machine immediately. Alternatively, there will be self-serve player EFA stations where a player may enter money and/or credits and load them into their EFA (or cash out an EFA).

Figure 11:
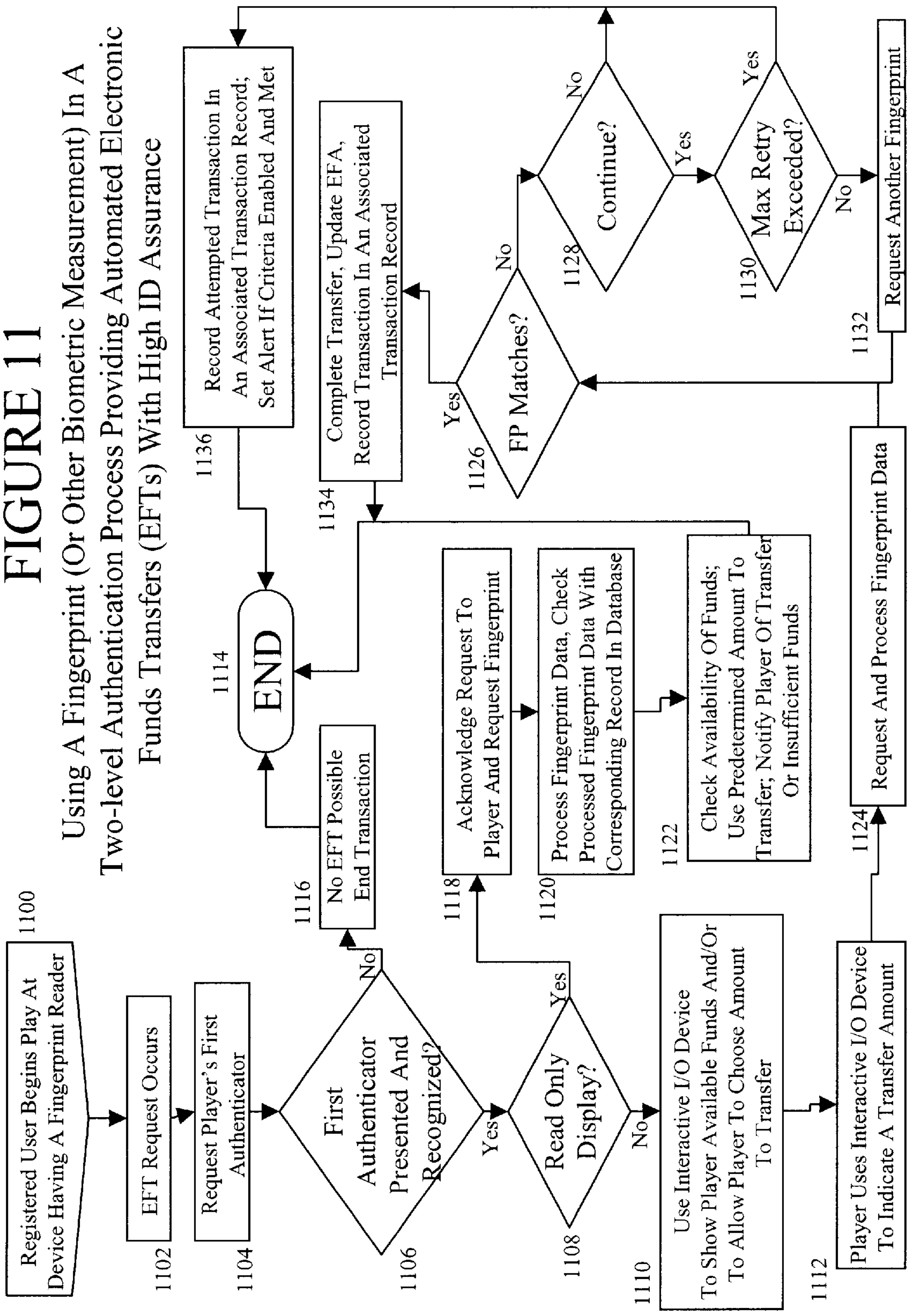
FIG. 11 is flow diagram showing electronic funds transfers using biometrically augmented authentication according to the present invention.

Proceeding to FIG. 11, a method of using the present invention for authenticating electronic funds transfers (EFTs) is shown. A player, having already created an entry in the player ID database, begins game play at a game machine having a fingerprint reader or other biometric device, box 1100. The player runs out of game credits or wants to transfer some of their winnings to their EFA, moving from box 1100 to box 1102. Box 1102 corresponds to the player initiating an EFT by using some form of user input button or device, preferably a touchscreen provided either as part of the main game device video display, or as a separate touchscreen operably connected to the biometric reader (in a preferred embodiment, a fingerprint reader) and separate from the game device as shown in FIG. 4.

Box 1102 is left and box 1104 is entered. Here, the system then requests the player's first authenticator. This will typically be a player ID of some kind, including but not limited to a traditional player ID card, a voucher ID, an RFID tag, or other authenticators used by the casino. In one embodiment, it will be first fingerprint data. Box 1104 is left and diamond 1106 entered. A decision is made based on two criteria: did the player present any first authenticator at all (perhaps they just touched the EFT initiate button to see what would happen, but have not set up an EFA); and, if one is presented, does it correspond to at least one entry in the player ID database?

The number of "hits" from the first authenticator will depend of the first authenticator being used, as explained previously. A valid voucher ID will yield one hit; first fingerprint data, a hand geometry read, or certain other biometrics could yield a couple of possible matches, depending on the number of print (or hand or other) criteria that was mapped from the biometric device and the number of people in the player ID database.

If the first authenticator is not recognized, the "No" exit is taken from diamond 1106 to box 1116. There is no EFT possible, so the system politely notifies the player as such (and may suggest a visit to a courtesy counter or for the player to signal a floor walker to create an EFA), and process flows from box 1116 to end point 1114.

Returning to diamond 1106, if an initial authenticator is presented and recognized, the "Yes" exit is taken to diamond 1108. The decision in 1108 is based on the availability of an interactive display, such as described in FIG. 4. If the display is a read-only display, being used in a situation where there may be, for example, a set of hard-wired buttons on the game device surround that are ordinarily used for game play but change mode (are multi-functional) after a player starts an EFT allowing a player to indicate only certain limited options (i.e., "Yes" and "No"), the "Yes" exit is taken to box 1118.

The actions corresponding to box 1118 are to indicate to the player the player's request has been received, and to ask for the players' second authenticator. The player provides the second authenticator, in one preferred embodiment fingerprint data (illustrated). Continuing onto box 1120, the fingerprint data (or other biometric input) is checked against the second authenticator data that is associated with the first authenticator (or, in some embodiments at some installations, first authenticators; this multiple check need only be done once for each session a player is at a particular game machine). If the second authenticator cannot be matched, the session is closed with no funds transfers and the player is instructed to go to a service counter (not illustrated). Leaving box 1120 for 1122, the player has now been authenticated with the use of two authenticators.

Action taken in box 1122 is to ask the player of they want to transfer funds from their EFA to the game device, or transfer credits (deposited as funds) from the game device to the EFA. Once the choice is indicated, an amount is either credited to or from the game machine currently in use. Because of the limited I/O in this case, a typical installation will transfer all the outstanding game credits to the EFA for deposit requests, or will credit a predetermined amount (typically a multiplier of the base play amount) to the game device. If there are not enough funds in the players' EFA for a requested action, the player will be so notified in a discrete fashion. The player is notified of either the success of the EFT, or alternatively (for short funds) of the inability to complete the requested action. Box 1122 is left for end node I 114, indicating the process is complete.

Returning to diamond 1108, if the I/O is fully interactive such as described with FIG. 4, then the "No" exit is taken to box 1110. The actions taken in box 1110 are to allow the player, using the interactive I/O device (in one preferred embodiment a touchscreen) to indicate what action they want to take. Actions may include checking the status of their EFA, transferring game credits into their EFA, or transferring funds into the game machine from their EFA. Differentiating this action from that found in 1122 is the range of options, and the preferred order of events. Because the I/O allows players to make whatever choices in whatever denominations they want, the options for transfers are not limited to any predetermined amounts. For example, a player may choose to transfer any number of available game credits into their EFA, whereas the process used for game machines with limited I/O devices will only have one or two predetermined choices. After indicated any and all transfers within the limits of the players' EFA, such as balances, box 1112 is left and box 1124 entered.

The action corresponding to box 1124 is that the player is asked for their second authenticator, in a preferred embodiment a fingerprint reader. Box 1126 is left after the player provides the second authenticator, or the system times out the player (in one embodiment this will be flagged as an invalid second authenticator). Box 1124 is left and diamond 1126 entered.

The decision corresponding to diamond 1126 is to check that the second authenticator provided matches the corresponding second authenticator data in the player ID database. If the fingerprint data matches, the "Yes" exit is taken and box 1134 entered. The actions corresponding to box 1134 include completing any and all transfers requested by the player (and allowed by the game device and EFA policies set by the casino), and then finish by recording the transaction(s) in a manner associated with the player ID, proceeding after box 1134 to the indicted finish node 1114.

Returning to diamond 1126, if the second authenticator does not match the second authenticator associated with the first authenticator using the player ID database, the "No" exit is taken to diamond 1128. The decision made here will be based on the procedures and polices of the casino. The casino may decide to allow no or several retries. For example, the second authenticator may not have matched due to dirt or sweat on a players' fingertip (in the case of a fingerprint reader). To avoid false rejections, a preferred embodiment will alert the player that the second authenticator did not match and ask them to retry, advising the player to make use of a hand towelette to wipe their finger and the reader, and try again. Two such reties would be allowed. If the player is allowed a retry, the "Yes" exit is taken to diamond 1130, where the number of retries is counted. If the maximum number has been reached, the "Yes" exit is taken to box 1136. If the maximum has not been reached, the "No" exit is taken to box 1132, where the player is asked for another fingertip read (or other biometric read). Box 1132 is left and diamond 1126 re-entered. The loop comprising 1126, 1128, 1130, 1132 back to 1126 is repeated until the maximum number of retries is completed. At that point, the "Yes" exit is taken from diamond 1130 to box 1136.

The action corresponding to box 1136 includes recording the failed attempt in a database entry associated with the EFA, and to set off any alerts to appropriate casino personnel in accordance with the types of actions the casino has decided should trigger alerts to their security people. After these actions, the process exits box 1136 and finishes at end node 1114.

Figure 12:
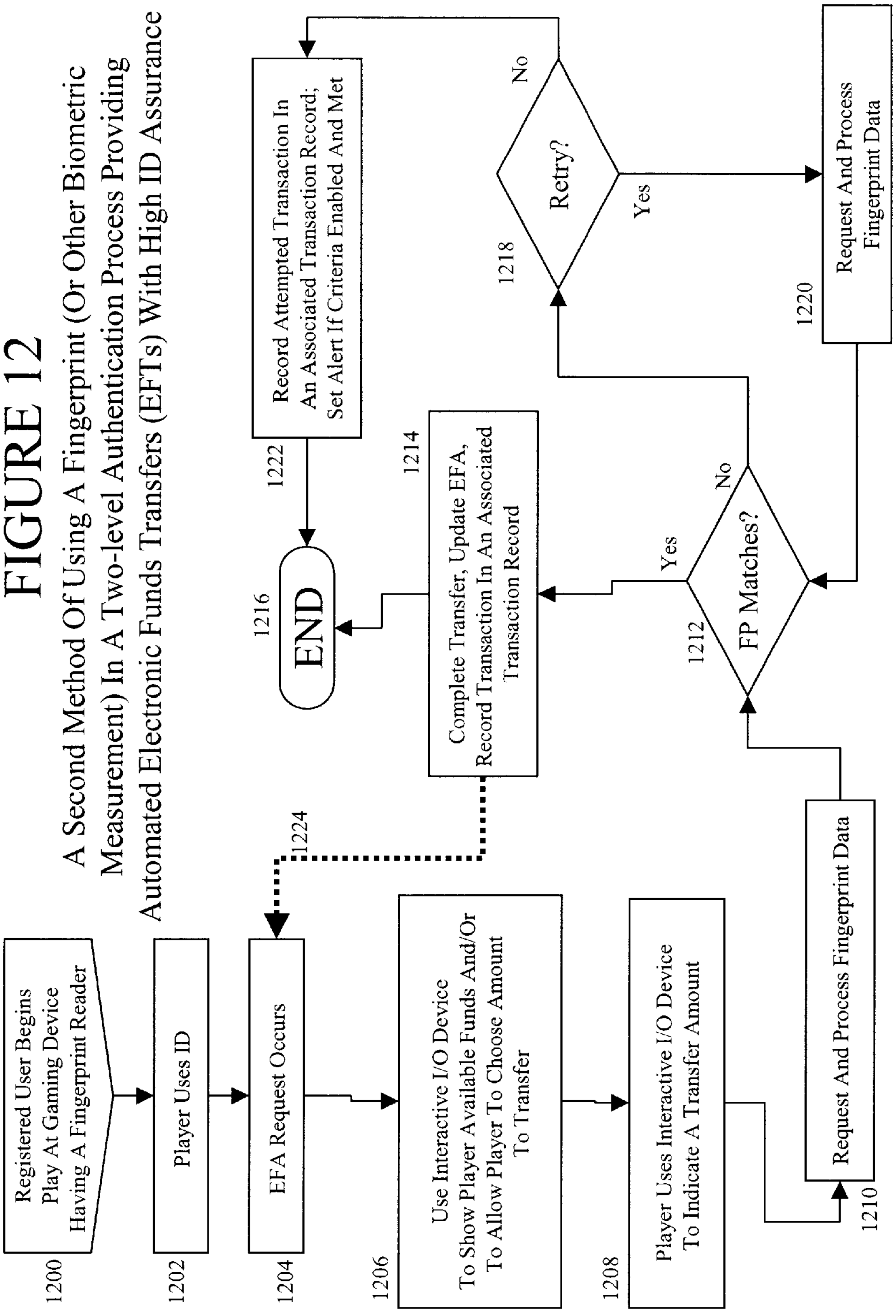
FIG. 12 is a flow diagram showing another method of electronic funds transfers using biometrically enhanced authentication according to the present invention.

FIG. 12 shows another process using two authenticators to provide high levels of assurance in a casino having EFAs, based on a preferred embodiment where any game device that has EFA capability further has a system similar to that illustrated in FIG. 4 where the embedded system shown as 410 or 412, in addition to having a touchscreen, has enough memory and the software needed to keep at least one player's second authenticator data in local memory in an operable manner, or, where network connection 414 is a high bandwidth connection (i.e., a 100 MB Ethernet, depending on the size of the instillation), minimizing response times to the player.

The player, already registered (having an entry in the player ID database) starts at box 1200 by playing a game on a device having a touchscreen. Proceeding to box 1202, the player uses their first authenticator before an EFT request is made. In a preferred embodiment, a unique player ID entry from the player ID database is always selected, so if the first authenticator yields more than one potential entry the player is requested, at this time, for their second authenticator (not illustrated). Box 1202 is left and box 1204 entered. The player, using a touchscreen (or other interaction I/O device), indicates they desire to make use of their EFA. Proceeding to box 1206, the player uses the I/O device to check balances and/or request an EFT either into the current game device or out of it. The player indicates they are ready to complete the transfer. In a preferred embodiment, the touchscreen presented to the player includes a standard set of deterministic options, similar to those found in the "fast withdrawal" screens on ATMs, allowing the player to make a selection with just one touch of the screen. Typical options on a touchscreen allowing a single touch of a virtual button (or any functionally equivalent screen indicia) may include "show EFA account balances", "cash-out" ("cash-out" in this context means "transfer all current game credits into my EFA in their monetary equivalent form"), and "transfer in X dollars worth of game credits", where there will be several choices of "X" shown as individually selectable indicia, and further where the amount used for "X" will be determined using a combination of casino policy and the base play amount of the game machine in use. Box 1208 is now left and box 1210 entered.

Box 1210 indicates the actions of requesting a second biometric authenticator (of course, this means the data associated with a second biometric measurement) from the player, in this case fingerprint data. After reading the player's presented fingertip, box 1210 is left and diamond 1212 is entered. Diamond 1210 corresponds to checking the data read from the player against the second authenticator data associated with the player ID in the player ID database. If it matches (the most common experience by this point in the process), then the "Yes" exit is taken to box 1214.

Box 1214 corresponds to carrying out the requested EFA or EFT transaction. Some kind of data about the transaction is kept in a database associated with the EFA, typically showing the date, time, amount, and target or source gaming device of the transaction. The transaction is now complete and finished. If the player leaves the current game machine, typically indicated by removing their player ID card or voucher ID, then box 1214 is left for end point 1216. Alternatively, if the player stays at the current game machine then the process may loop as many times as the player desires, as shown by dotted line 1224.

Returning to diamond 1212, if the fingerprint data does not match the data associated with the current player in the player ID database, then the "No" exit is taken to diamond 1218. The decision indicated in diamond 1218 is if a fingerprint reading retry is to be allowed. As discussed above for FIG. 11, this decision may be based on a combination of things, including but not limited to casino policy on allowable retries, and in a preferred embodiment will include for the initial retry a suggestion to the player to do try several things including but not limited to: (1) clean their finger and the reader with a small disposable wipe cloth (typically provided in the coin tray); (2) make sure the finger being used is the same one they used to create the database; and, (3) check that their finger is sitting squarely on the reader.

If the decision is to allow a retry, diamond 1218 is left and box 1220 is entered. The actions corresponding to box 1220 are to request and process another reading of a fingertip, then to return to diamond 1212.

The retry loop comprising: data check and fail (diamond 1212); retry (diamond 1218); get new input (box 1220); and back to data check and fail (diamond 1212) continues until the maximum number of retries is exceeded or the process times out (this protects against leaving a transaction partially completed if the player leaves the game device). When the loop ends, the "No" exit is taken from diamond 1218 to box 1222, where the failed attempt is recorded in a manner associated with the EFA. There may be other actions such as suggesting to the player they call over a floor walker for help; these other actions will be at the discretion of the casino. The process is now finished, exiting box 1222 to end node 1216.

As can be seen in FIG. 12, this process will ordinarily be very fast and efficient from a player's viewpoint. After presenting some kind of initial authenticator at the game device, the player is uniquely identified (if a second authenticator is required at this stage to reduce two [multiple] possible matches to a unique individual, it will be done, but this is only required in situations where the initial authenticator is not a typical player ID). In one preferred embodiment, the data associated with the second authenticator will now be downloaded to a system in the game device capable of dealing with the biometric input, shown in FIG. 4 as a separate embedded system within a game cabinet. Now, each time the player wants to make use their EFA, the authentication step will be extremely fast ("extremely fast" means close to instantaneous from a player's perspective—they will properly align their fingertip on the fingerprint reader and the data read and check will be done in less than a second or two). This provides confirmation for each EFA action that the player who identified themselves at the start of the session is, in fact, making the request, providing a very high degree of assurance coupled with very little additional aggravation to the player. This becomes especially evident when compared to traditional alternatives that have either very low assurance by not doing any check after accepting an ID card, or medium-level assurance with high aggravation by requiring the entering a password each time.

Figure 13:
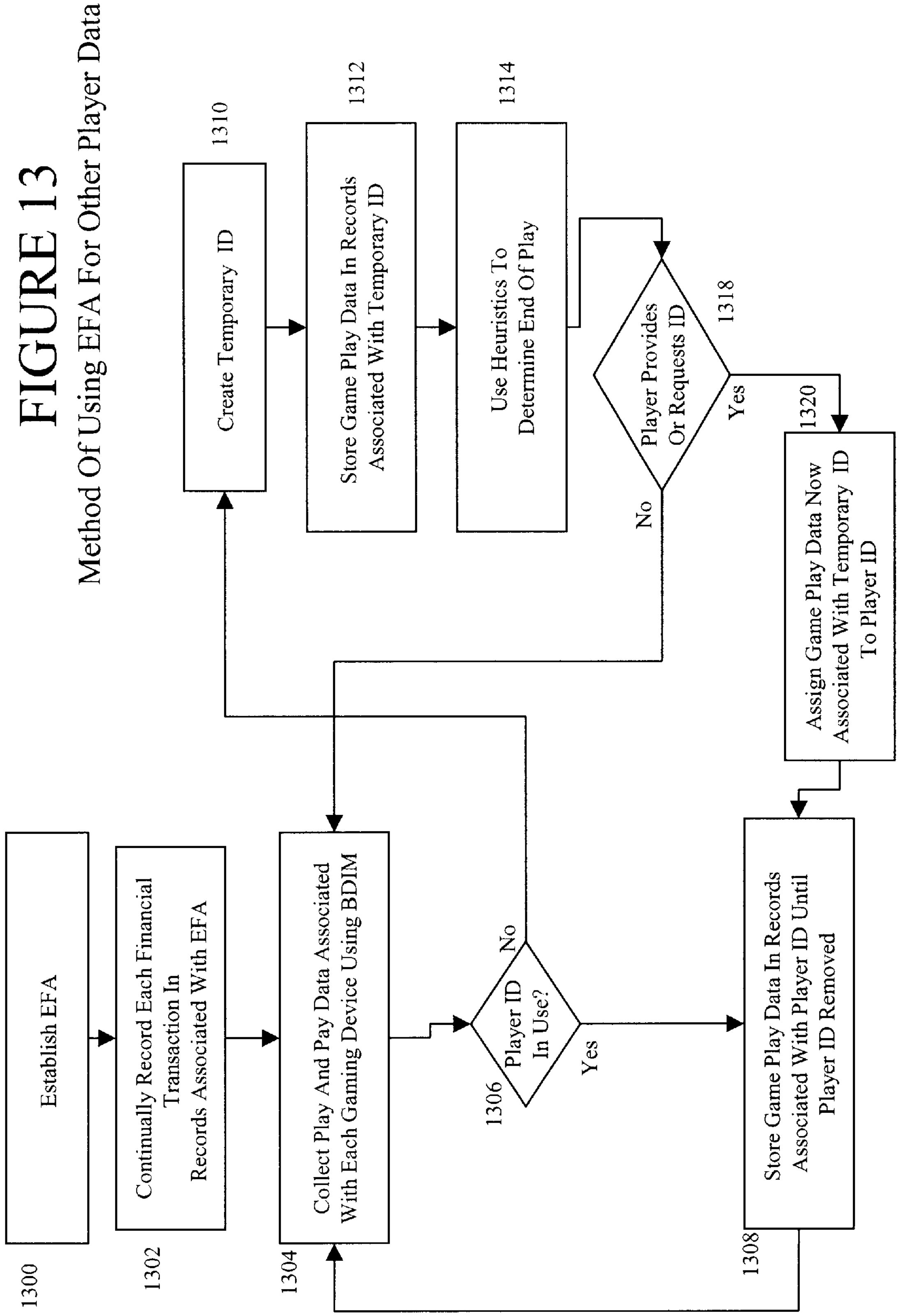
FIG. 13 is a flow diagram showing the use of biometrically enhanced authentication with electronic funds accounts keeping additional player data in accordance with the present invention.

FIG. 13 shows the use of a two-authenticator EFA system for the gathering of other player and game data as well as the data attributable to EFT activities. This is readily accomplished using the type of systems shown in FIGS. 4 and 5 (including those where the system used for the biometric reader communicates over the same network as the game system to a single backend system, not having an intermediate system such as an RGC thereby, where the functions carried out by the RGC are done on the backend system).

Box 1300 corresponds to the player setting up an EFA, details of which have been discussed. After setting up an account, the process continues with box 1302 which corresponds to recording all the activity directly related to the use and management of an EFA—balance inquiries, EFTs, direct withdrawals, direct deposits, etc. Thus, a set of data detailing account activity is already enabled with the EFA system, and data is being kept on all active EFA accounts. Proceeding now to box 1304, the DBIM will process the signals that the RGC will be receiving that have all the traditional pay and play data as each game device is being used (i.e., pay-ins, pay-outs, "handle-pulls", game device state such as the position of the reels upon a winning event, etc.). Alternately, in newer implementations the RGC may not be present, in which case the data will be sent to a backend machine on which the DBIM will reside. The underlying functionality remains the same. The DBIM (Biometric Device Information Manager) correctly correlates the data coming into from a game device to the data coming in from its associated biometric reader. Box 1304 is left and diamond 1306 entered.

The actions corresponding to diamond 1306 are to check the data originating from the game device (either from the SMIB or the Reader, depending on the configuration) and note if the player is using a player ID. If the player is, the "Yes" exit is taken to box 1308.

The actions corresponding to box 1308 are to store the data being collected and associated in the RGC (by the BDIM) and save it in a retrievable manner associated with the player's EFA. In a preferred embodiment, this will data in the same database that holds the account activity data. Box 1308 is left when a player withdraws their player ID (card, voucher, etc.), indicating they are finished at this game. The process then goes back to box 1304, gathering game data related to the next player. Although not shown, in addition to player ID withdrawal to indicate game play is over, a preferred embodiment will always use several heuristics such as a time-out feature (the player forgot their ID in the game device) or a no-activity feature to further indicate an end-of-play. These additional heuristics will be implemented at the discretion of the casino.

Returning to diamond 1306, if there is no player ID in use the "No" exit is taken to box 1310. Actions corresponding to box 1310 include the DBIM creating a temporary ID (typically a unique numerical ID), and associating the game play data with the newly created temporary ID. Proceeding to box 1312, the game play data is stored in a retrievable manner, associated with the temporary ID. In a preferred embodiment, the same database as the EFA database will be used, where a temporary ID is used in a player ID field (perhaps designated as a special key) and the associated game play data is kept in a manner associated with this temporary ID. Continuing on from box 1312 to box 1314, the process uses heuristics to determine if the play on the game device has stopped. This will typically be indicated by the insertion of a player ID (meaning someone else has taken over this machine and is using a player ID), time delays, and play delays. Some heuristics will be better than others, and other methods may be used as well, including the use of an RFID tag, or with data generated from a facial recognition biometric reader to determine when a new player sits down at the machine. Whatever method and device is used, an end-of-play state will be recognized at some point and the data gathering associated with the temporary ID will stop. Box 1314 will be left for diamond 1318.

The actions taken in diamond 1318 are to ask the player if they want to be assigned a traditional player's ID or an anonymous player ID (APID). Anonymous player identifiers are any identifier used by a player that does not contain personal information in the database entries associated with the ID. Co-pending application entitled "Anonymous Player Identifiers In A Gaming Environment" having application Ser. No. 09/819,112 explains APIDs more fully, and is incorporated herein, in full, by explicit reference. If the player decides to accept either form of player ID, several actions may taken. In a preferred embodiment, the player is presented with a special voucher which has, encoded and preferably encrypted on it, either the temporary ID assigned to this session by the DBIM, or another indicia that may be used to look up this game session. The player then takes this voucher to a player counter (or specially designated floor walker), and gets a traditional player's ID, or some form of APID. This is the simplest method, and will be easy to implement. In another preferred embodiment, the BDIM will have the ability to issue an APID directly from the reader or game device being used; a traditional player's ID will still require the player to either call a floor walker or go to a service counter.

Note that although this step is shown following box 1312, box 1312 and diamond 1318 may be readily swapped, or a copy of diamond 1318 may be inserted between boxes 1310 and 1312, or 1312 and 1314.

If the player does not present an ID, or does not want some form of an APID (perhaps in the form of a voucher ID), the "No" exit is taken, the data is kept stored with the temporary ID (in a preferred embodiment a unique numerical sequence), and the process continues with the next set of game play data being gathered at box 1304.

If the player presents a player ID, an already issued APID, or indicates they are willing to accept an APID, the "Yes" exit is taken to box 1320. The game play data already gathered is now associated with the ID and so stored. Box 1320 is left and box 1308 entered. Note that if the player has finished play at this game, box 1308 acts as a "pass-through", and process proceeds at box 1304.

If the player is using a newly generated ID, they will be invited to make use of an associated EFA. Note that an EFA may be opened and used with an APID as well as a traditional player's ID. In fact, the use of EFAs coupled to APIDs will be encouraged. Anonymous EFAs (an EFA being used with an APID) will typically be used by people who do not play regularly, who are at the casino for only a short amount of time, and who do not keep much in them. Note that is a separable method and use from that which automatically generates the paperwork and authenticates an IRS event. If an IRS event is generated, then the normal paper process will have to be carried out.

In addition to game play data, this process just described may be used for saving any and all savable game state. Savable game state is defined as any and all game state which a player may choose to save and then use at a later time. This will typically be (in addition to game winnings) award states, promotional awards won at the game, and interim game results. The types and uses of savable game states is more fully disclosed and discussed in co-pending application Ser. No. 09/788,168 entitled "Method And Apparatus For Maintaining Game State", incorporated herein in full by reference. In the preceding descriptions for FIG. 13, whenever "game data" is gathered and associated with an ID, the same process applies to any and all savable game state.

If an electronic account holds both monetary data and game state data, the account may be referred to more generally as an electronic account as well as an electronic funds account, and when using the electronic account a transfer may be referred to as an electronic transfer rather than an electronic funds transfer. For the purposes of this disclosure, "electronic funds account" and "electronic account", and "electronic funds transfer" and "electronic transfer" refer to an account that has the capability of handling both monetary and game state data. When in use in a casino or other establishment, the particulars of that establishment will determine which capabilities they want and can support.

Figure 14:
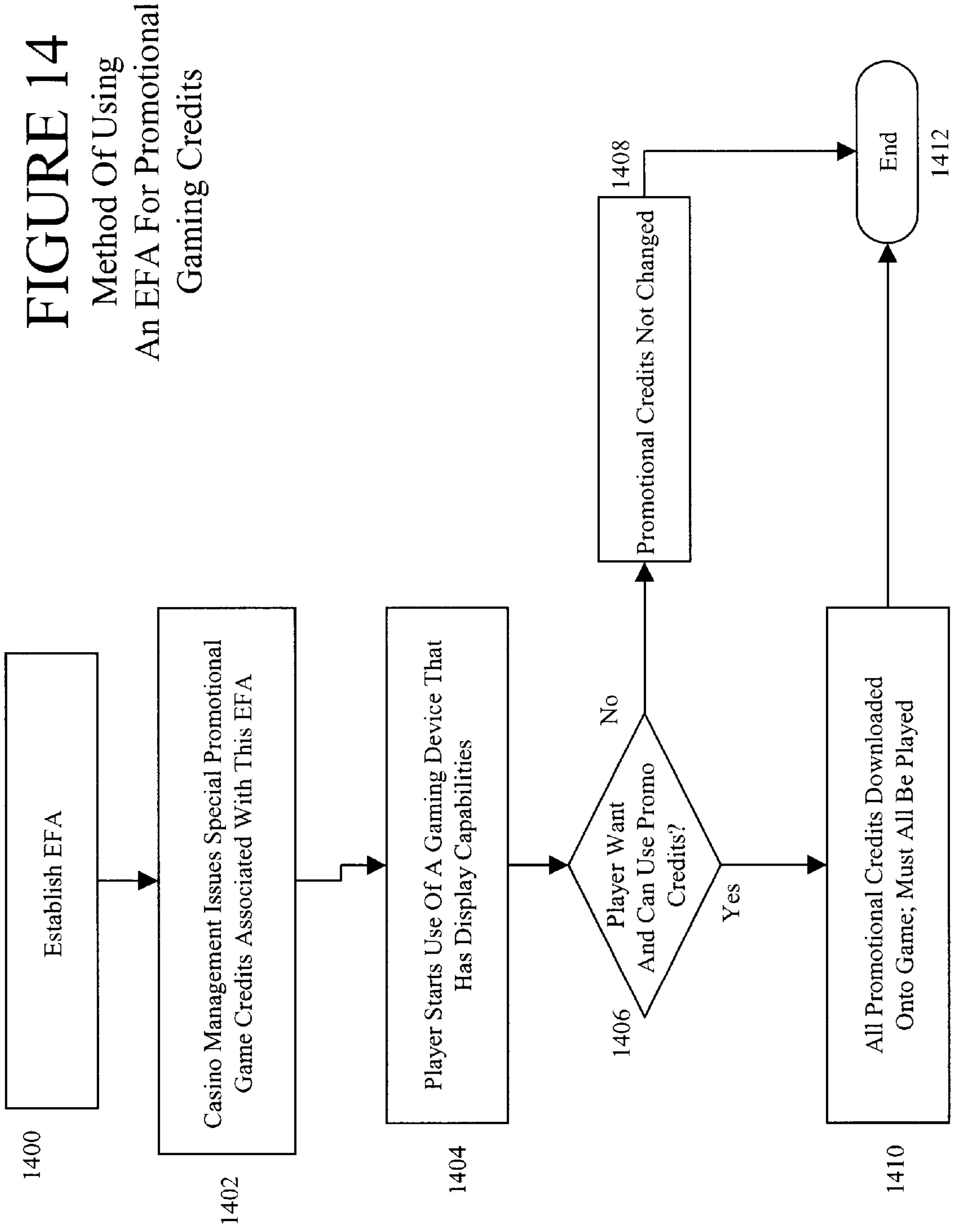
FIG. 14 is a flow diagram showing the use of a biometrically enhanced authentication electronic funds account with promotional game credits according to the present invention.

Referring now to FIG. 14, a method for using an EFA for promotional game credits is shown. Box 1400 corresponds to the creation of an EFA. Note that the EFA may be a "traditional" EFA, that is, an EFA coupled to a traditional player's ID card or other ID form, or may be an anonymous EFA, that is, an EFA coupled to an APID. Proceeding to box 1402, the casino management decides to offer promotional game credits to holders of EFAs. The decision process may encompass many divergent forms, from a general awarding of a few game credits issued to all EFAs and usable on any game device, to the issuance of a substantial number of game credits to a selected subset of EFAs usable on only one or a few selected games. After the choice is made, the EFAs eligible to have the promotional game credits will have promotional game credit indicia associated with them. Box 1402 is left and box 1404 is entered.

Box 1404 corresponds to the action of the player using a game device and their ID. Upon presenting their ID, in the preferred embodiment using a touchscreen for an I/O device, a special display comes up. The special display is actually the standard display and "quick choice" buttons, coupled with an additional choice indicia or button showing the player they have promotional game play credits. Part of the special display shows or lists for the player what games the game play credits may be used on (including all games, if that is the case). If they player is not a game device on which the game credits may be used, this alerts the player to try the freebie games (this will be especially useful in introducing new games). Box 1404 is left and diamond 1406 is entered.

The actions and choices corresponding to diamond 1406 are, first, the player indicating they want to use their promotional game credits. This is followed by checked to see if the game device they are currently using is one of the games that the credits may be used on. If so, the "Yes" exit is taken and box 1410 entered. Box 1410 corresponds to the action of setting the current game play credits to the amount indicated by the promotional game credits, thereby exhausting the promotional credits. After the promotional game play credits are used, end node 1412 is entered.

In a preferred embodiment, the promotional game play credits are not intermixed with any other part or portion of the EFA, and must be used in toto. This is to encourage the play of new or underutilized game devices—it requires the player to use all the promotional game credits at one machine and at one sitting, once the player chooses to use the promotional credits at all. In addition to generally introducing players to new games by giving free initial sessions, if the game has a learning curve associated with it before a player becomes proficient or comfortable, the player is rewarded for their time to learn the new game by allowing them to play freely.

Returning to diamond 1406, if the player does not choose to use their promotional credits at this time the "No" exit is taken to box 1408. The actions corresponding to box 1408 are that the promotional credits simply remain unused, (and will reappear each time a player uses their EFA until they are used) or they are age expired and removed (i.e., an expiration date is passed, this portion not illustrated). Box 1408 is left and end node 1412 entered, finishing the process.

Figure 15:
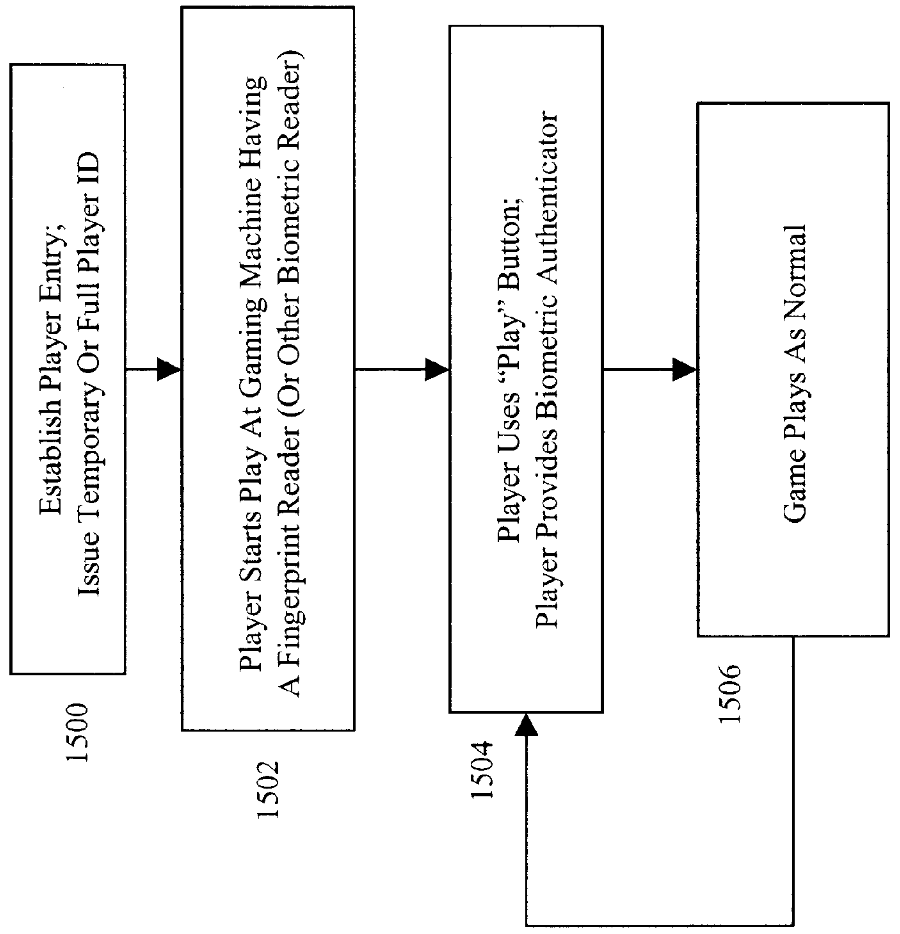
FIG. 15 is a flow diagram showing the use of biometrically enhanced authenticator for age verification according to the present invention.

Continuing with FIG. 15, shown is a method of using a two authenticator system for age verification. This may be useful in any location where underage persons may try and play a game. Box 1500 corresponds to setting up a player ID entry for use as an age verifier. This may constitute setting a traditional player's ID account, the process explained earlier. But that is not required using the present invention. Another type of account may readily be set up, called an "Anonymous Legal Age Account" (ALAA).

This account consists of a player going to a customer service counter and showing needed ID to the person at the counter. This may also be done over a video link and be handled remotely if so desired. This may become necessary as internet gambling becomes more prevalent. The casino person confirms the ID of the person in front of them. If the check is being done over the internet, the casino may check the ID by being in operable connection to the state's license and resident ID database. The casino attendant will then enter the ID number presented to them, and check if the presented ID, the ID recalled from the state or other governmental source, and the person appearing before them in front of the camera all match. If they do, the attendant then asks the player to use the biometric reader provided (in a preferred embodiment, a fingerprint reader).

Although presented in the context of APID use, this ID check would clearly work when used to generate a traditional player's ID as well.

The system correlates the fingerprint data with an anonymous player ID (APID), where the casino attendant may also record the ID check sequence. The APID is then generated and given to the player—in one preferred embodiment the APID would be a voucher ID, set to expire in one day, or perhaps one week (the intent is for the APID to be good for one visit to the casino, or for only a limited amount of time). In another preferred embodiment, especially usable at very small establishments having little infrastructure, all APIDs would expire every time the casino closes for the night.

Continuing on with box 1504, the actions taken are for the player to use their initial authenticator on the game they wish to play. This would comprise, for example, inserting a voucher ID into a voucher reader when making use of an ALAA account. Then, the player makes any play selections, etc., and gets ready to use the "play" button, triggering the gaming device. Upon using the "play" button, the player also puts their fingertip on the fingerprint reader. The fingerprint reader creates a fingerprint data set, confirms a match with the fingerprint data associated with that ALAA (or any traditional player account). As soon as confirmation is made (the data presented and the data associated with the player ID match), the play button is enabled. Box 1504 is left and box 1506 is entered.

Returning for a moment to a game's play button, as used in this disclosure the term "play button" or "game play button" refers to any implementation of a user interface which is what a player would interact with to initiate game action or game play. Traditionally, this is a physical button labeled "play" on the game's front panel, and the player pushes it to initiate game play after having made certain betting and game play choices. However, the term includes any and all means that may be used to initiate play, including touchscreen virtual buttons and the like. This further includes the use of similar buttons such as "auto replay" buttons, which are typically configured in game devices to allow a player to replay the game with the same game settings as just played (i.e., the same amount, the same number of paylines, etc.). All such buttons which result in a game play are included.

Returning to FIG. 15, Box 1506 corresponds to normal game play. As soon as this game event is finished, the process continues by returning to box 1504. The loop comprising 1504 (select play, provide authenticator) to 1506 (game plays a round as normal) to 1504 (select play, provide authenticator) continues until the player is finished playing. This provides extremely high assurance that the person who showed their ID is, in fact, the person who is actually playing the machine. Each play requires confirmation that the person playing is the person who showed their ID to the casino attendant. This goes a long way towards preventing "substitutions", where one player shows their ID and is of age and allowed to play, but the actual play at the machine is being done by another person of unknown age (presumably underage, although possibly someone banned in a casino).

Notice that this aspect of the two-level authorization works very well for both players and the casinos, including players concerned with record keeping associated with fingerprint data. There is no need to keep permanent records. The personnel at the desk make the check that a player is of age and allowed in the casino. The amount of data needed is small, since a single fingerprint data set is on the order of KBytes. This can quickly be downloaded to an individual game device, if the game device is configured as shown in FIG. 3 or 4, or kept in a very small, inexpensive database (such as is available for a PC running Windows™ or UNIX™) when used with a game device such as shown in FIG. 1, 2, or 4 (4 may be used in either case). Each time the player hits the play button, they simultaneously touch the fingerprint reader and play continues.

To make players feel more secure, the casino or bingo hall can further offer to delete the APID and fingerprint data when the player leaves. The player simply presents the APID to the customer service counter when they are ready to leave, the casino personnel feed the APID (for a small installation, preferably a voucher ID) into the computer that is acting as a system console behind the service counter. The system console has privileges to add and remove data from the database. The casino attendant simply touches the delete portion of a touchscreen (in a preferred embodiment), or enters a simple key sequence to remove that ID and any associated data from the system.

This allows any installation, even very small casinos, bingo halls, and similar gaming environments having limited technical infrastructure and personnel, to make effective use of the present invention. The casino personnel will know that each "play" of a gaming device is being confirmed, while being played, as initiated by someone whose ID has been checked by casino personnel. It simultaneously provides identity security and, if the player desires, anonymity.

Figure 16:
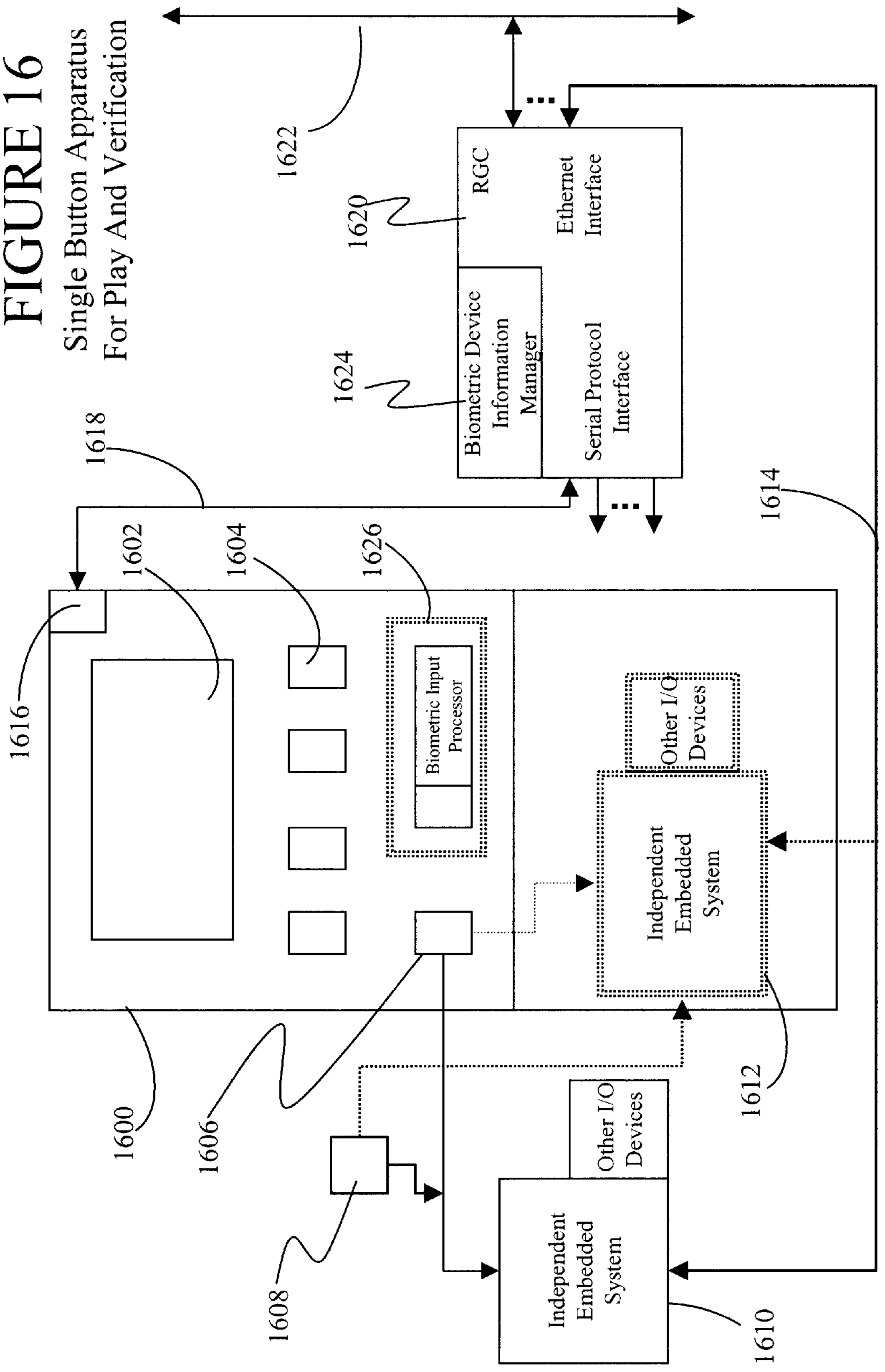
FIG. 16 is a block diagram showing the functional components of a combined play and authorize button according to the present invention.

FIG. 16 shows a particular device that enables the process explained in FIG. 15 to work even more effectively. FIG. 16 shows a gaming device generally configured like the gaming device shown and described in FIG. 4. There is a cabinet 1600 containing the game device, a display (typically video, but may be mechanical reels and similar mechanisms) 1602, and play buttons shown generally as 1604. Inside cabinet 1600 are the typical hardware and software components of a gaming device having at least one CPU and a dynamic memory, plus connectors, power supplies, busses, and the other ordinary aspects of such a device (not illustrated) connecting display 1602, buttons 1604, and SMIB 1616. SMIB 1616 is connected via network 1618 to RGC 1620, through one of RGC 1620's individual game device network interfaces (typically a serial-protocolbased interface).

As described earlier for FIG. 4, two embodiments of a two-level authorization system are shown as embedded systems 1610 and 1612 (only one would be used per cabinet). Embedded system 1610 is implemented standing beside game cabinet 1600, or inside an enclosure attached to cabinet 1600, and embedded system 1612 would be operably mounted inside cabinet 1600, with a display and interactive I/O capabilities usable by a player, preferably mounted in cabinet 1600 just below the traditional play buttons 1604, or just below a bolster on the front portion of the cabinet. Either implementation would use network connection 1614, preferably an Ethernet network, to connect with RGC 1620 through a different network interface than the traditional SMIB. 1622 shows that the network has other devices on it as well, and will typically be a casino-wide backbone network. Note that in the future, the SMIB (or its replacements) may well use the same network interface as the embedded system. This change to the SMIB would not change the invention or its use and implementation, although it would make casino wiring easier. DBIM 1624 correlates the information arriving from game device 1600 and embedded system 1610 or 1612, as explained above.

The single button play/authorized may be implemented in a number of ways. Three embodiments are shown: 1606; 1608; and, 1626. The primary functionality of each is the same. In each case there is a play button and fingerprint reader in a single physical combination, allowing the player to both initiate game play and provide authorization at a single touch. This greatly enhances the ease of use for the player while providing high assurance to the casino of the person who is playing.

The physical mechanism may be implemented in a number of ways. One is to use one of several commercially available fingerprint readers and use the output for two purposes. The first is to generate fingerprint data that results from a fingertip reading; the second and new use is to use a positive fingertip read event coupled with a positive match using a fingerprint comparator operably disposed within the logic associated with the multi-function button and using a preloaded fingerprint data set to initiate game play, mimicking a standard play button. Note that some game device further proved some form of "game replay" button, which initiates game play using the game parameters (game betting choices, any selectable pay line settings, etc.) that a player used in the last play. The present multifunction button will mimic either of those two types of buttons, or any other type of button that initiates game play. If a casino prefers game devices to have both buttons, two multifunction buttons may be provided on the game console for customer use. Internally, they may share portions of the logic associated with fingerprint data comparisons, or may comprise two separate buttons and support logic.

Another button embodiment is to combine a fingerprint reader into a depressible mechanical surround, such that the player puts their fingertip on the central portion which enables a fingerprint reading, and further presses the button down slightly to initiate play. Other solutions may be used as well. Each will require slightly different electromechanical interfaces and are shown generally as play/authorize buttons 1606, 1608, and 1624.

Play/authorize button 1606 shows an implementation where the mechanism is installed near the traditional game play buttons. In a preferred embodiment it replaces the previous initiate play button. The play/authorize button will interface to 1610 or 1612, depending on which is being used in this cabinet. In addition to reading and checking fingerprint data, play initialization occurs. This may be carried in several ways, including providing an electrical signal that is the same as that produced by the standard play button, to the regular game using the regular game's wiring after the fingerprint data is checked. In a preferred embodiment, the embedded system will contain the fingerprint data applicable to the current user locally, and further be enabled with a fingerprint comparator, implemented either in hardware, software, or a combination, that has the functionality to check the two data sets (the data associated with the second authenticator and the data just being read from the fingerprint reader) and so complete the authorization check locally, for speed's sake. Comparing fingerprint data is not simply a matter of linear, black-and-white data comparison, due to the differences with which a person puts their finger on the reader, dirt, orientation, etc. For the purposes of this disclosure, two sets of fingerprint data are said to "match" or be "comparable", both terms being interchangeable as used herein, when to the best of the ability of the algorithms being used, and using the two available fingerprint data sets, the two appear to originate from the same person. After this check is completed, a "play" signal (electrical pulse) is generated and sent to the game device either by its own internal wiring which was connected to the previous play button, or play is started by sending the appropriate signal back through the RGC to the SMIB.

Play/authorize button 1608 shows an implementation where the button will physically be located with either embedded system 1610 or 1612, rather than in the area already having play buttons. If used with system 1610, the play/authorize button will reside on same enclose which contains the embedded system. If used with system 1612, the play/authorize button will be located at or near the same location as the other I/O associated with the embedded system, typically just below the regular game play buttons. Its functionality will be the same as that described above for play/authorize button 1606.

It is expected that in the near term, play/authorize buttons will be implemented in one of the manners just described. Longer-term, it is expected that a larger portion of play/authorize buttons will be implemented along the lines indicated by play/authorize button 1626. A small, self contained play/authorize button and support board with appropriate logic will replace the regular, single function play button. The board and logic to support the multifunction play button may include any needed subcomponents, up to and including specially designed ASICs and FPLAs to carry out any needed functionality to send and receive the required signals from both the game device (which thinks this is just a normal play button) to receiving and processing fingerprint data from a database. Depending on the costs, space available, required functionality (local or remote fingerprint data analysis), and power requirements other implementations may make use of a small, low powered embedded system with a limited amount of RAM.

When used by the player, the authorization will either be carried out locally on the dedicated board or the fingerprint data will be checked on a backend computer system (if RGCs are still in use, it may be done by the BDIM on the RGC); the same communications path used by the game device will be used, typically by providing an additional socket (connection) on the SMIB for use by the play/authorize button interface board. Another implementation of play/authorize button 1626 makes use of the game processor for fingerprint data matching, downloading the required software into the processors memory; because of the regulatory control of the game devices this may not be desirable in all cases.

One additional use of play/authorize button 1626 would be in standalone game devices. The interfaces to the logic implemented as described above could readily be adapted to allow signals to be sent to play/authorize button 1626 to, at first, receive fingerprint data from its associated fingerprint reader, and then simply store it. The fingerprint data that is next read will be compared to the fingerprint data currently in memory. This comparison may be used as the age check. Each time a player whose ID has been checked by a casino attendant, and who entered their fingerprint data into a game device with the help of an attendant, uses the machine their authorization check will be made. This is not the best implementation, but may be considered in some situations have very limited technical infrastructure.

The present invention has been partially described using flow charts. As will be understood by a person of ordinary skill in the art and with the benefit of the present disclosure, steps described in the flow charts can vary as to order, content, allocation of resources between steps, times repeated, and similar variations while staying fully within the inventive concepts disclosed herein.

Accordingly, it will be seen that this invention provides a system and method for providing authentication of a player that has both high assurance and is fast. This may be used for many applications, including EFAs/EFTs, automated W2G generation, and continual age verification. Although the description above contains much specificity, the description should not be construed as limiting the scope of the invention; the descriptions given are merely providing an illustration of embodiments of the invention. The scope of this invention is determined by the appended claims and their legal equivalents.

What is claimed is:

1. A system enabling individual player identification usable in a gaming environment and using at least two authenticators, the system comprising:

means for entering a first authenticator in said system;

means for entering at least one more authenticator in the form of biometric data in the system;

means for associating said first authenticator and said at least one more authenticator with an individual player;

means for individual player identification at a game device using a reading means operable with a presented first authenticator and a biometric reading means where said first authenticator is one of: a magnetic stripe card; a voucher; an alpha-numeric sequence; an RFID tag; a smart card; a memory card; a handheld device having retrievable memory and an RF interface; a handheld device having retrievable memory and an IR interface; a magnetic diskette; or, an optical diskette.

2. A system enabled for the creation of a player identification usable in a gaming environment and having at least two authenticators, the system comprising:

means for creating a first authenticator in said system usable as an initial authenticator for searching for an entry in a player identification database, where said first authenticator is not a biometric authenticator;

means for entering into said player identification database at least one more authenticator in the form of biometric data associated with said initial authenticator;

means for associating said first authenticator and said at least one more authenticator with a player; and, means for player identification at a game device using said first authenticator and at least one of said at least one more authenticators.

3. The system of claim 2 where said at least two authenticators further comprises at least three authenticators, and said means for associating said first authenticator further comprises assigning a search sequence indicator for each of said additional authenticators, where said search sequence indicator will be used to determine the order in which the authenticators are used to identify a player.

4. A system having at least two authenticators for identification of a player, where one of the at least two authenticators is identified as a first authenticator, and where at least one of the remaining authenticators is identified as a second authenticator, and further where any authenticator that is not a first authenticator comprises data derived from a biometric measurement, usable at a game device having an associated biometric reader, comprising:

means for reading a first authenticator presented to a game device by a player;

means for reading biometric data from said player using a biometric reader;

means for using said first authenticator to find an associated second authenticator;

means for checking data derived from said biometric reading to said associated second authenticator; and, means for indicating results of said check of data.

5. The system of claim 4 where said first authenticator is one of: a player ID card; a voucher ID; or, an APID (anonymous player ID); a magnetic stripe card; a voucher; an alpha-numeric sequence; an RFID tag; a smart card; a memory card; a handheld device having retrievable memory and an RF interface; a handheld device having retrievable memory and an IR interface; a magnetic diskette; or, an optical diskette.

6. The system of claim 4 where said means for checking data further comprises means for ending the identification process and any actions requiring completion of the identification process if no entry in a player database corresponding to said first authenticator is found.

7. The system of claim 4 where said means for checking data further comprises:

means for checking said biometric data against said second authenticator if there was one entry in said player identification database associated with said first authenticator;

means for indicating a failure to said player if said biometric data does not indicate a match to said second authenticator;

means for checking said biometric data against each identified second authenticator if there was more than one entry in said player database corresponding to said first authenticator; and, means for indicating a failure to said player if said biometric data indicates one of: less than one match; or, greater than one match, with any of said identified second authenticators if there was more than one entry in said player database corresponding to said first authenticator.

8. The system of claim 4 where said second authenticator comprises fingerprint data.

9. The system of claim 4 where said biometric data is fingerprint data, where said second authenticator comprises fingerprint data, where said biometric reader is a fingerprint reader, and where any authenticator in addition to said first and second authenticators comprises further fingerprint data.

10. The system of claim 4 further comprising:

means for reading additional player biometric data which can be associated with an additional authenticator;

means for checking said additional player biometric data with said additional authenticator; and, means for indicating a positive result if said means for checking said additional player biometric data indicates a match.

11. A system usable for verifying age during game play using at least two authenticators where one of the at least two authenticators is identified as a first authenticator and where at least one of the remaining authenticators is identified as a second authenticator and further where any authenticator that is not a first authenticator comprises data derived from a biometric measurement, comprising:

means for associating a first authenticator with a player's age;

means for associating a second authenticator with said first authenticator;

means for reading a first authenticator presented by a player at a game device;

means for reading biometric information from said player at said game device;

means for comparing said read biometric data with a second authenticator retrieved using said first authenticator;

means for enabling said player to play a game if said read biometric data matches said second authenticator.

12. The system of claim 11 where said first authenticator is one of: a voucher ID; a player's card; an Anonymous Player ID (APID); a smart card; a magnetic stripe card; an alpha-numeric sequence; an RFID tag; a handheld device having retrievable memory and an RF interface; a handheld device having retrievable memory and an IR interface; a magnetic diskette; or, an optical diskette.

13. The system of claim 11 where said using said means for reading biometric information from said player occurs before each game play.

14. The system of claim 13 where said means for reading biometric information further comprises a single button having therein a fingerprint reading means and a game play initiation means.

15. A system enabled for form generation using at least two authenticators, where one of the at least two authenticators is identified as a first authenticator, and where at least one of the remaining authenticators is identified as a second authenticator, and further where any authenticator that is not a first authenticator comprises data derived from a biometric reader which measures a biometric measurement, usable at a game device associated having an associated biometric reader, comprising:

means for creating an entry in a player identification database having a first authenticator and having at least a player's name;

means for associating a second authenticator with said first authenticator, said second authenticator being a biometric authenticator;

means for associating a player using a game device with an entry in said player identification database;

means for identifying a form-generation event;

means for generating an at least partially completed form using data from said entry in said player identification database; and, means for using a biometric authenticator to verify said form.

16. The system of claim 15 where said form generating event is a W2G generating event.

17. The system of claim 16 where said at least partially completed form further comprises a fully completed form using data previously entered into said player identification database.

* * * * *